Inventors
Robert H. Lawson
John B. Lawson

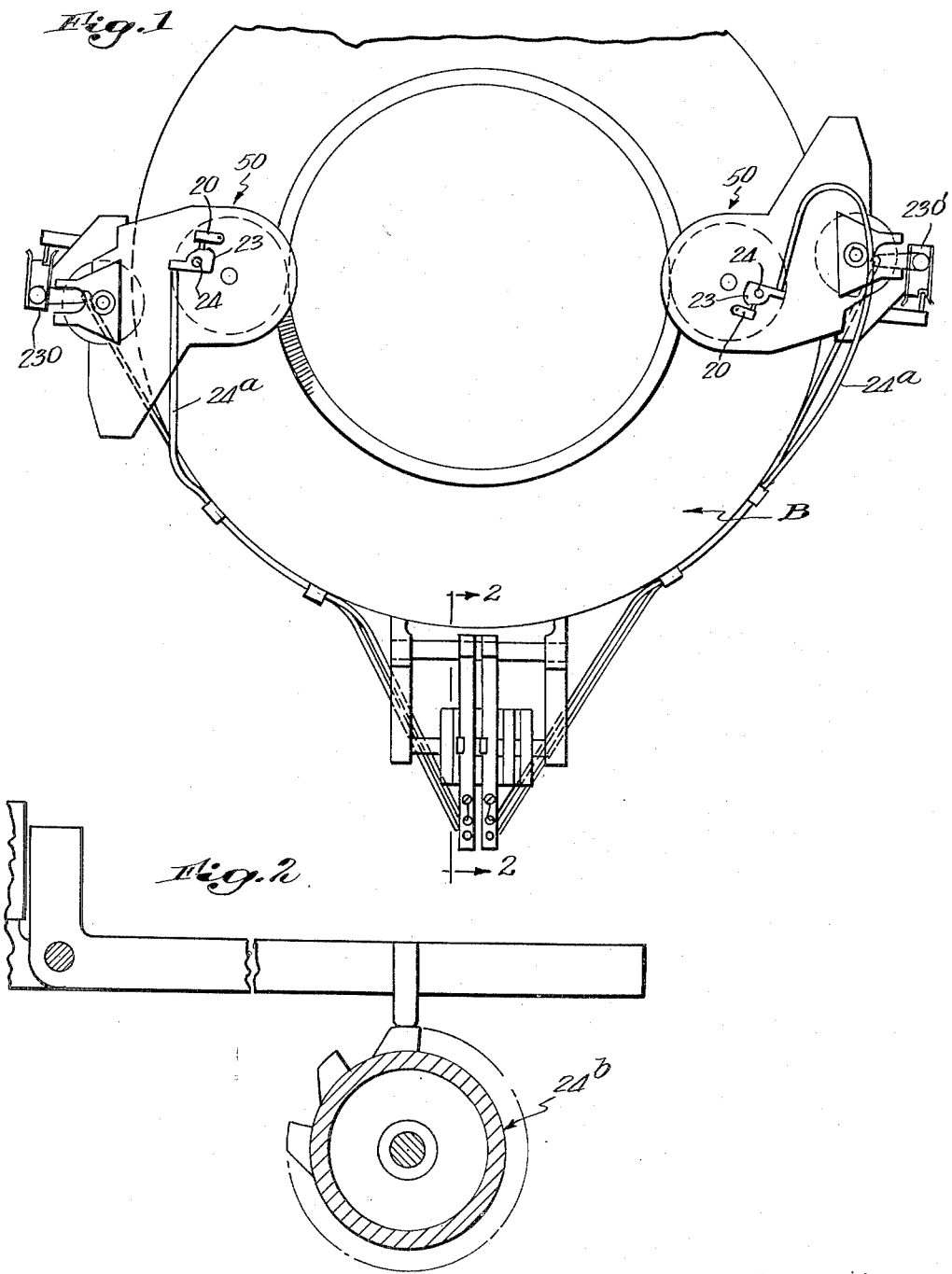

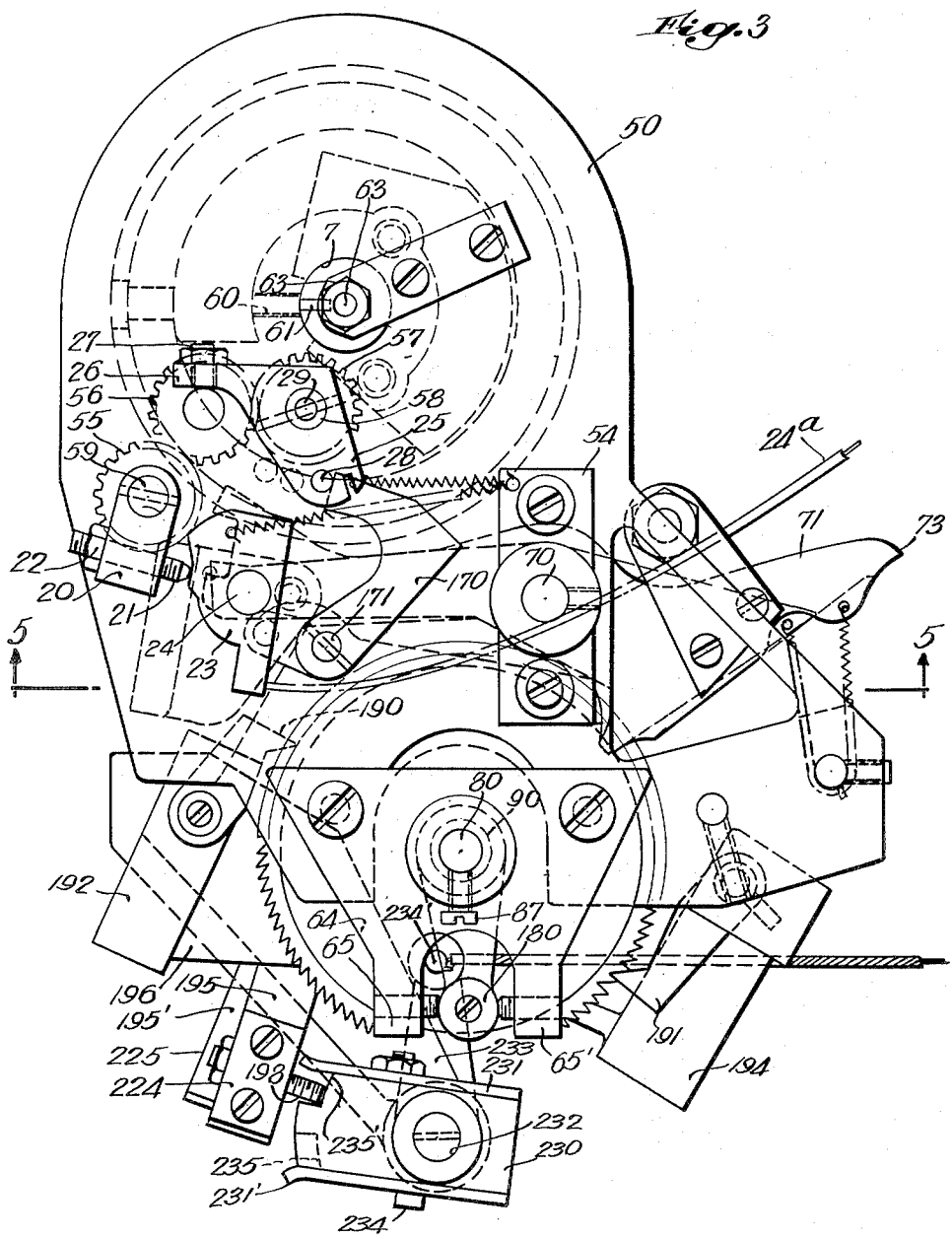

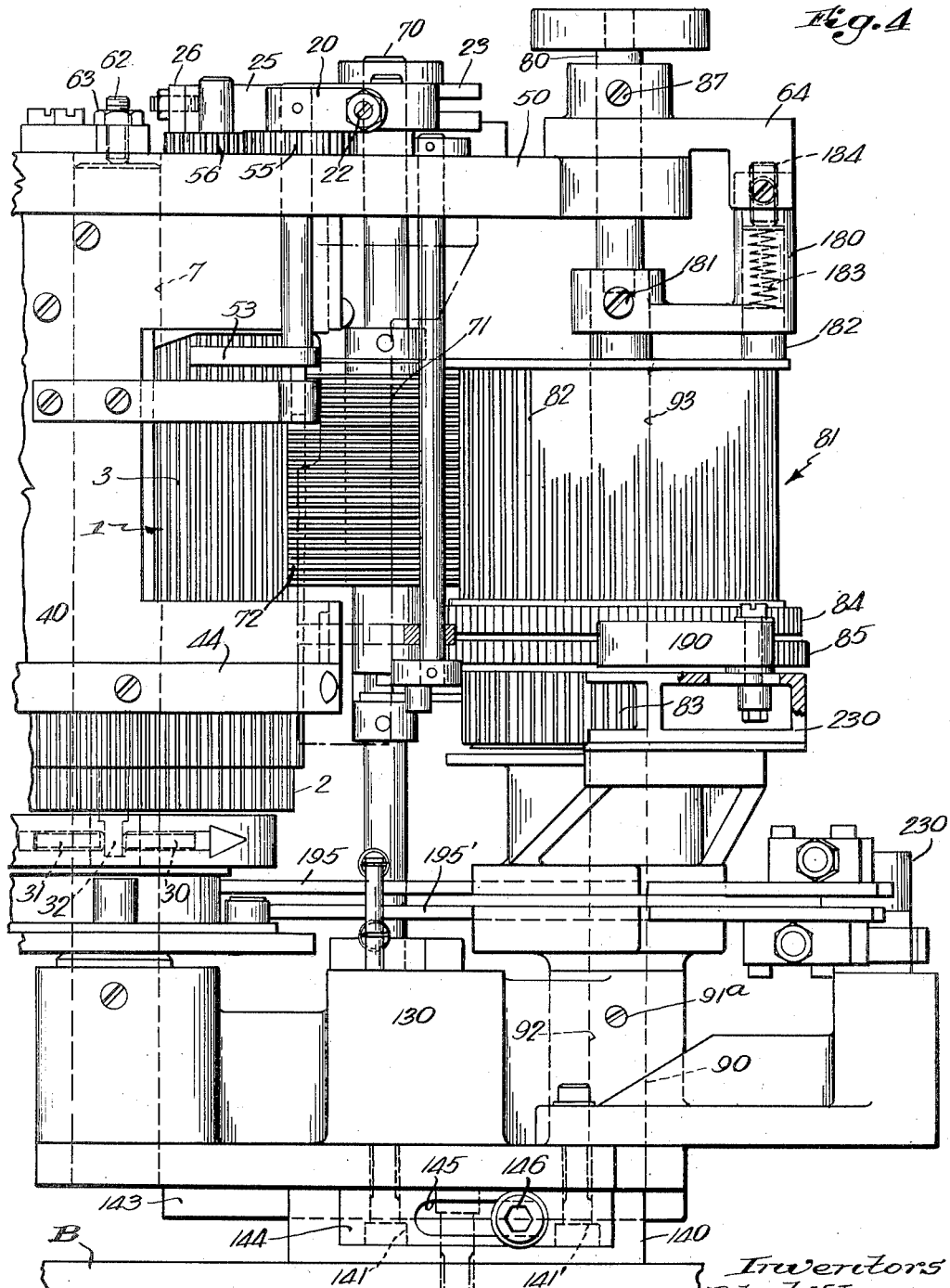

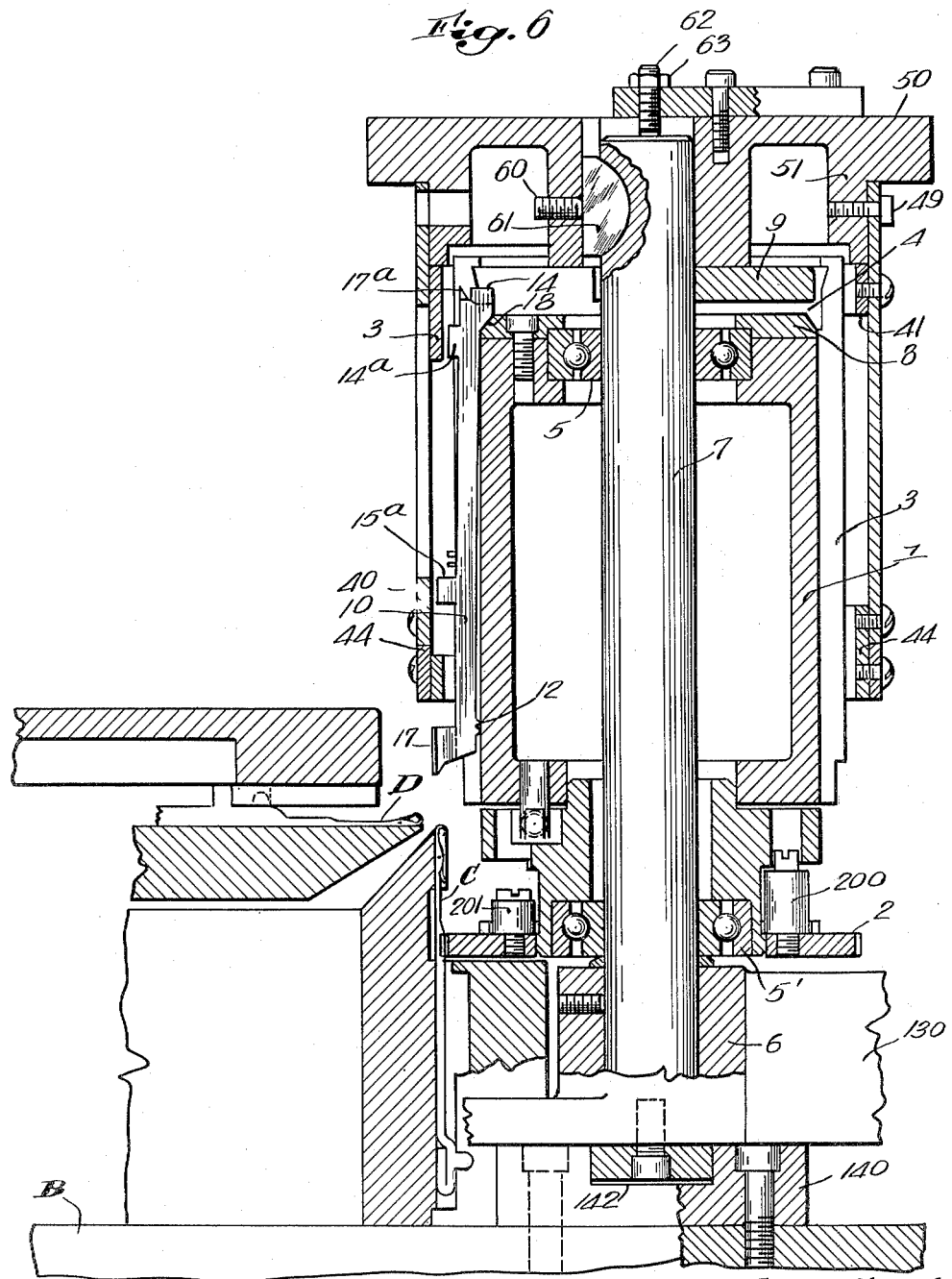

Sept. 25, 1956   R. H. LAWSON ET AL   2,764,006
READILY REMOVABLE AND REPLACEABLE DIAL OR
CYLINDER NEEDLE SELECTION ATTACHMENT
Filed Sept. 21, 1951   12 Sheets-Sheet 6
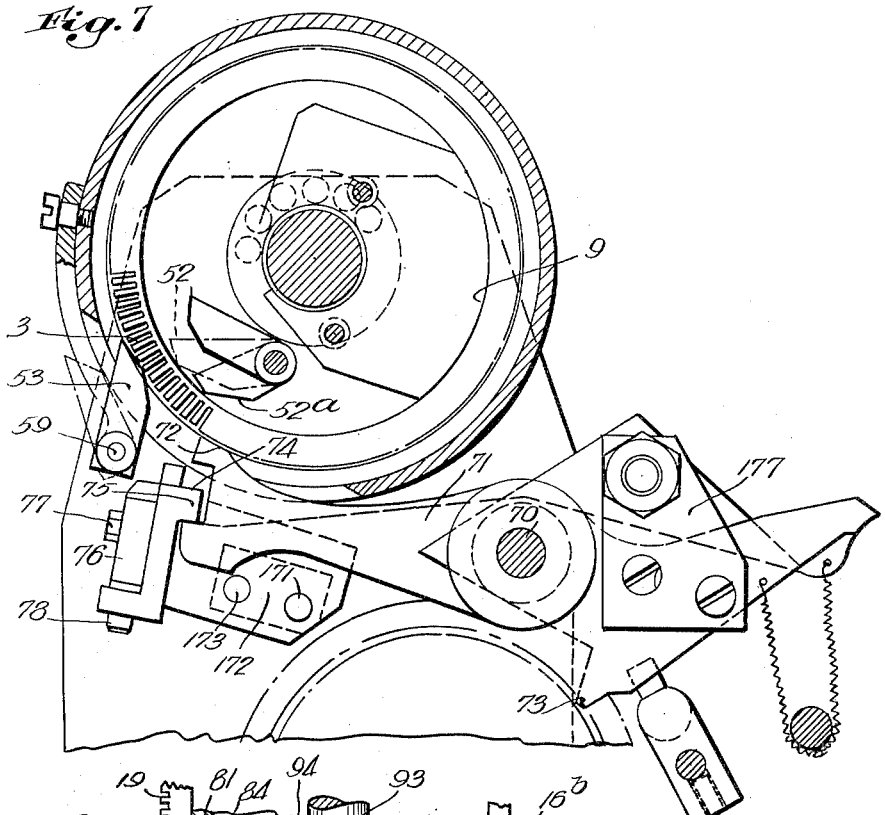
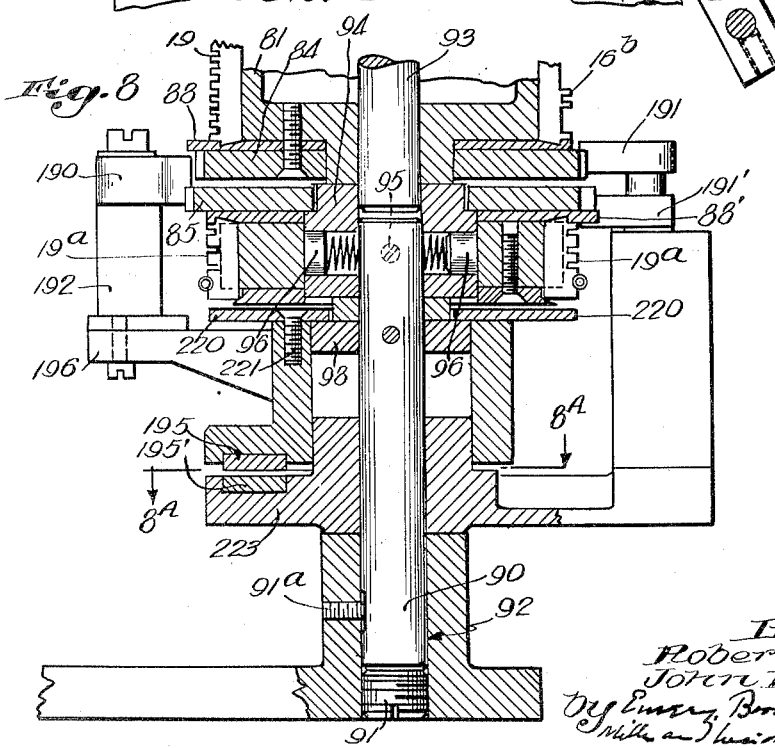
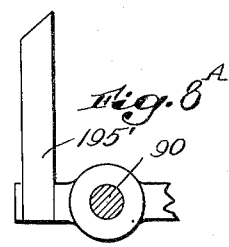

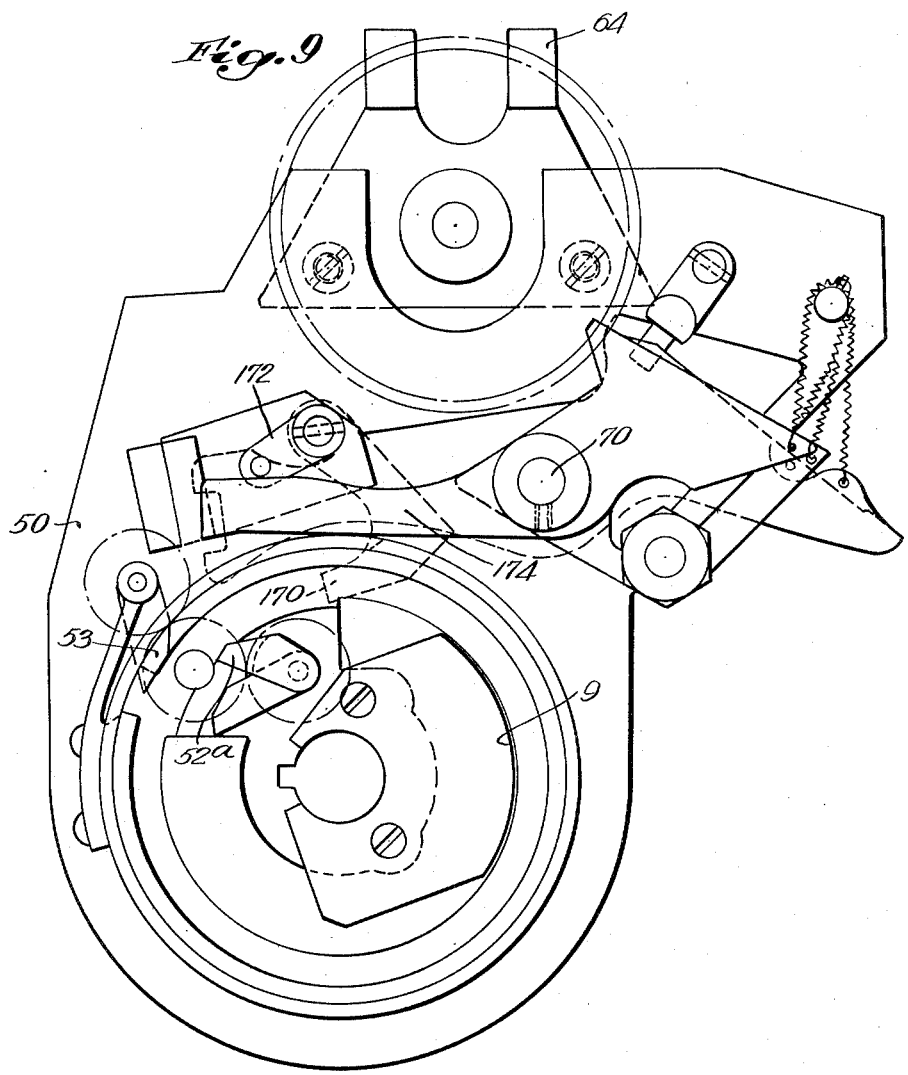

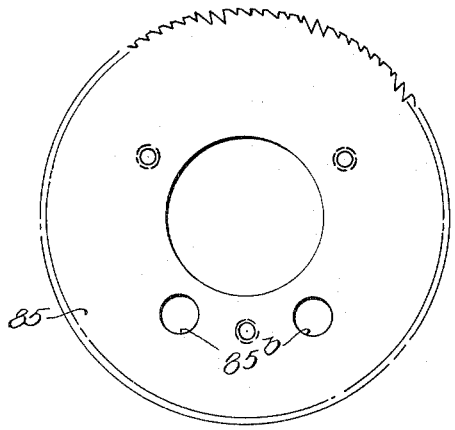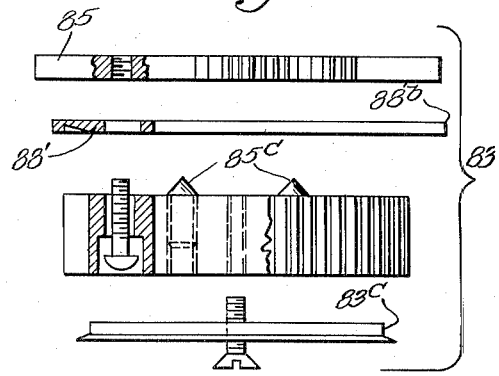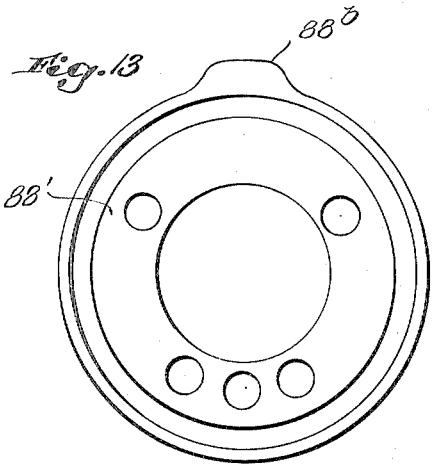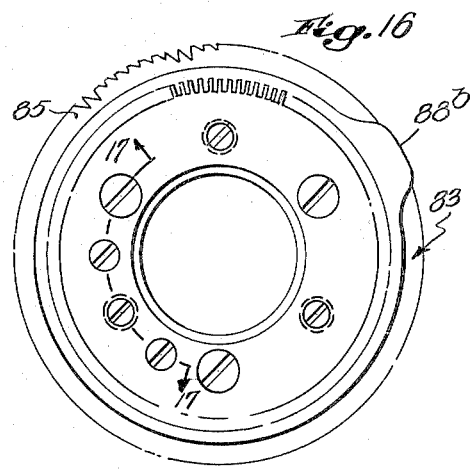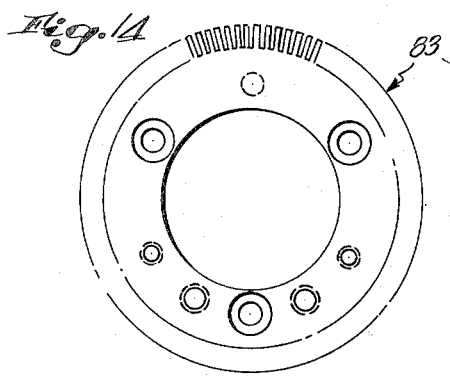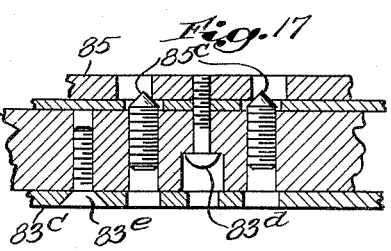

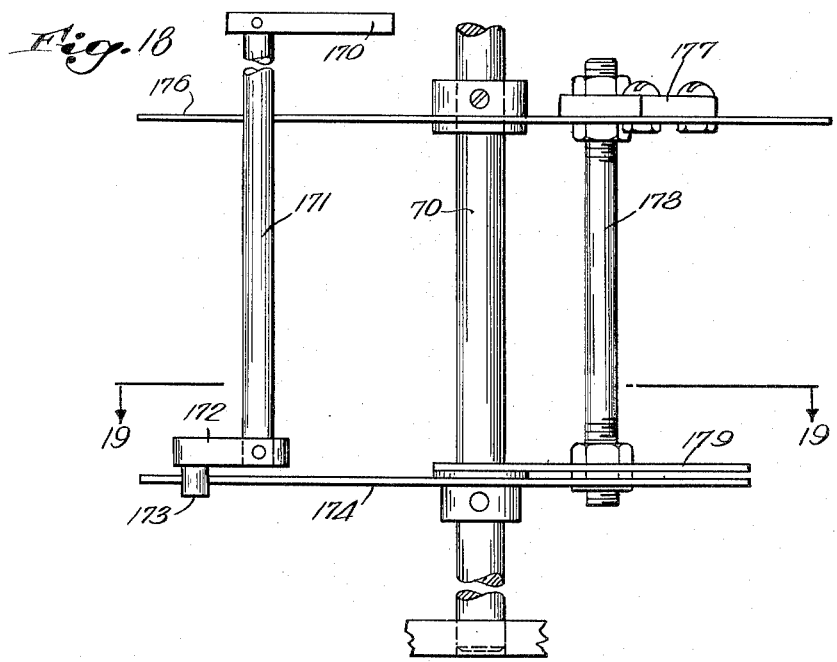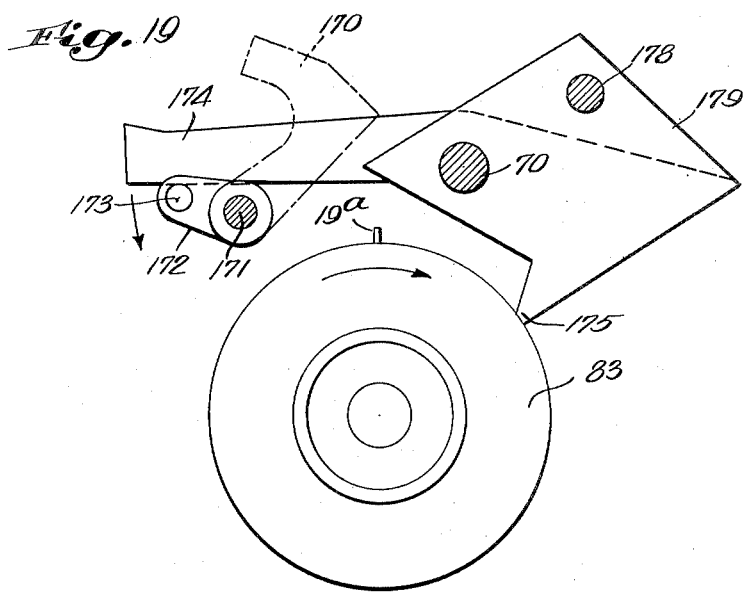

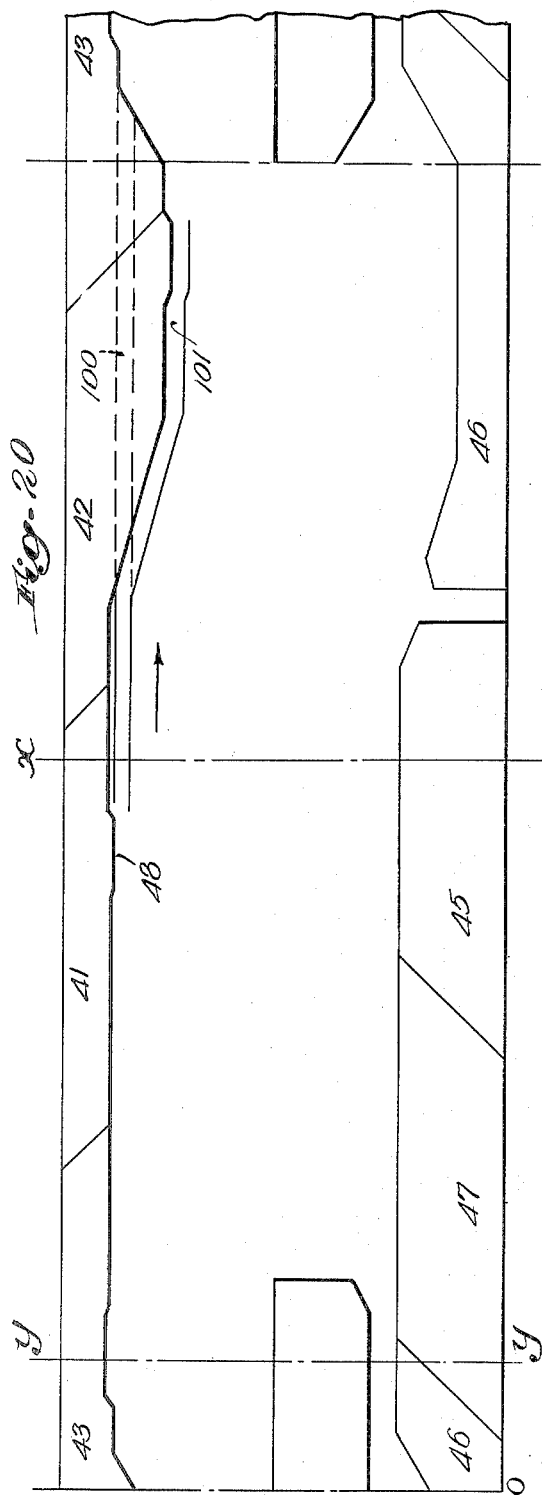

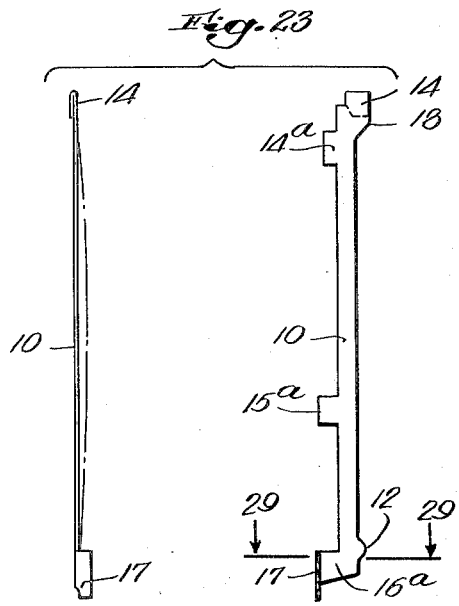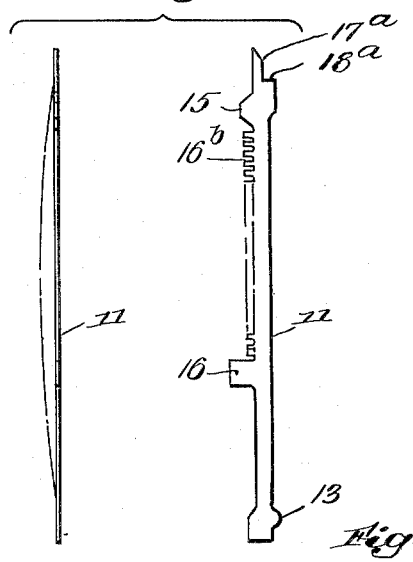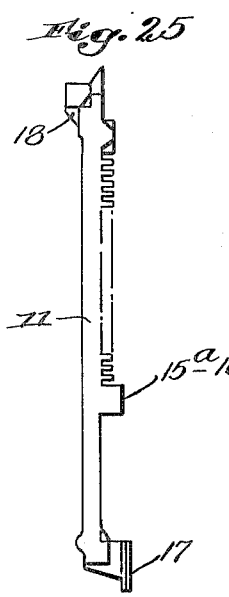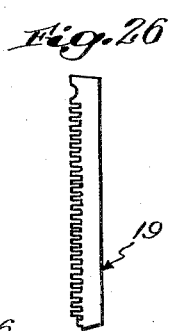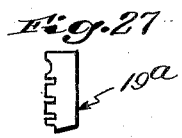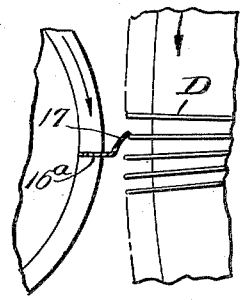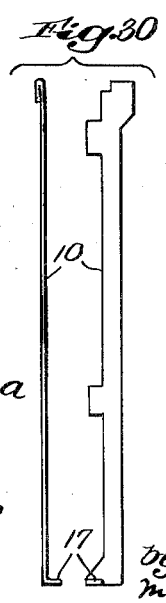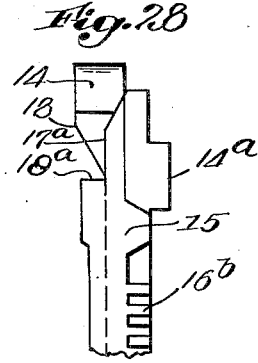

United States Patent Office 2,764,006
Patented Sept. 25, 1956

2,764,006

READILY REMOVABLE AND REPLACEABLE DIAL OR CYLINDER NEEDLE SELECTION ATTACHMENT

Robert H. Lawson and John B. Lawson, Lakeport, N. H., assignors to Lawson Products, Inc., Pawtucket, R. I., a corporation of Rhode Island Application September 21, 1951, Serial No. 247,582

66 Claims. (Cl. 66—25)

This invention relates to readily removable and replaceable needle selection attachments, units or devices, herein shown as selecting dial needles for pattern purposes, but which may, by making certain changes in the needle jacks and cams, be used to select cylinder needles instead, for pattern purposes.

The broad purposes of the invention are, namely, (1) to enable a circular latch needle knitting machine, herein disclosed as of the dial type, to be quickly transformed from one capable of making only plain work (that is, ribbed work without designs or with only simple designs), to one capable of making very complex designs; (2) to enable such a knitting machine not only to be converted quickly into one capable of making very complex designs, but also to enable the same knitting machine to be quickly converted back to a machine that knits ribbed work without designs, or having very simple designs; (3) to provide a needle selection attachment, mechanism or device that is essentially self-contained, but having the capacity of operating in multiples on the same knitting machine with other attachments or devices of the same type, and/or with other controls on the machine, such as for fashioning, this being done by providing, (a) a self-contained retiming device or means that can be remotely controlled; by providing, (b) controls for the selecting instrumentalities that can cause all the selecting instrumentalities to follow a selecting or a non-selecting path, at will, regardless of the pattern; by providing, (c) a retiming device that will reset the patterns in a minimum length of time and necessitating a minimum number of courses being knit during such retiming; and by providing (d) a pattern control within the needle selection attachment or device itself that will enable the pattern drum or drums to be moved in accordance with a prearranged selection, regardless of and without interfering with normal operating movements.

The needle selecting attachment, mechanism or device herein disclosed is self-contained, so that upon removal from the knitting machine it can be caused by manual manipulation to go through all its movements for selection, that is, by rotating the herein disclosed jack cylinder thereof by hand and moving the controls for the herein disclosed racking means by hand. In other words, the needle selecting attachment or device, even off the knitting machine, will operate to select jacks according to prearranged pattern, merely by turning the jack cylinder herein disclosed by hand, thereby greatly simplifying the task of adjusting or replacing the attachment or device.

When the needle selecting attachment, mechanism or device is in place on the knitting machine, such machine supplies power to the said jack cylinder of the attachment or device and the master drum on the knitting machine "tells" or instructs the needle selecting attachment, mechanism or device, through its control, when to rack and when to retime. Also the main drum of the knitting machine can completely erase the jack selection, as for ends of garments, such as girdles or foundation garments, causing all the jacks to take either an active or an inactive path, according to the type of knitting desired.

Certain important features that make the foregoing possible and which will be described herein in detail are:

(1) Certain racking rolls upon the gear of the jack selecting cylinder;

(2) Certain other racking rolls on the said gear of the jack cylinder to provide retiming;

(3) A so-called "bluff" wheel; and (4) The provision of the jack cylinder and the pattern drum on the same base or support and constituting a part of the unit, so that they are readily removable together from the knitting machine, which is thereby instantly converted into a plain machine, as already stated.

As will be disclosed herein in detail, the entire needle selecting attachment, unit or device is built upon its own base or support, which base or support can be quickly removed from its position upon the frame of the knitting machine, close to the lower end of the knitting machine cam cylinder or ring. What is herein termed an "adapter" is provided as a permanent part of the knitting machine. It is so made as not to interfere with the operation of the knitting machine when the attachment, unit or device is removed. The adapter insures that the attachment, unit or device will always be placed back into exactly the same position on the knitting machine, thereby making reassembling easier, and exact.

In order that the principle of the invention may be readily understood, we have disclosed a single embodiment thereof in the accompanying drawings, wherein:

Fig. 1 is a plan view of a circular, independent needle, knitting machine, showing two dial needle selecting units in operating position;

Fig. 2 is a vertical section enlarged on the line 2—2 of Fig. 1;

Fig. 3 is a plan view of one dial needle selecting apparatus or device constituting the attachment;

Fig. 4 is a side elevation of the entire dial needle selecting attachment in position on the knitting machine;

Fig. 6 is a vertical section through the needle jack and selecting jack cylinder in the grooves whereof the needle jacks and selecting jacks are supported for movement and showing the same in relation to the needle cylinder and needle dial of the knitting machine;

Fig. 7 is a transverse section through the said needle jack and selecting jack cylinder but with the top cap removed and looking down into the said cylinder;

Fig. 8 is a vertical central section through the lower or small pattern jack drum and through the lower part of the upper pattern jack drum, in the slots whereof pattern jacks are mounted;

Fig. 8A is a horizontal section on the line 8A—8A of Fig. 8;

Fig. 9 is a bottom plan view of the larger pattern drum and certain adjacent parts and looking upward so as to show certain cams in full lines;

Fig. 12 is a plan view of the ratchet wheel of the smaller pattern drum, showing adjustment holes;

Fig. 13 is a bottom plan view of the bluff reset cam of said pattern drum;

Fig. 14 is a top plan view of the said smaller pattern drum;

Fig. 15 is an exploded view of the four parts of the said smaller pattern drum;

Fig. 16 is a top plan view of the parts of the said smaller pattern drum assembled;

Fig. 17 is a vertical central section upon the line 17—17 of Fig 16;

Fig. 18 is a side elevation showing a certain top plate cam and a lower plate cam in assembled position but with most of the intermediate parts omitted;

Fig. 19 is a horizontal section on the line 19—19 of Fig. 18;

Fig. 20 is a diagrammatical development of the jack cams and showing also an active and an idle path therefor;

Fig. 21 is a plan view of certain dial needle cams;

Fig. 22 is a small detail in transverse section of one of said cams, on the line 22—22 of Fig. 21;

Fig. 23 is an edge view and a view in side elevation of one of the needle jacks and indicating in dotted lines the flexing or bending of the needle jack so as to provide friction with the companion selecting jack;

Fig. 24 are similar views of one of the selecting jacks;

Fig. 25 is a side elevation of one needle jack and one selecting jack as positioned in face-to-face relation in a single slot in the cylinder wherein they operate;

Fig. 26 is a side elevation of one of the long pattern jacks that are mounted in the larger pattern drum;

Fig. 27 is a similar view of one of the pattern jacks that are mounted in the smaller pattern drum;

Fig. 28 is an enlarged view of the upper part of a needle jack and of a selector jack as positioned in a single slot of the cylinder, the selector jack having been moved upward so as to be in part positioned over the upper end of the needle jack;

Fig. 29 is a detail in transverse section on the line 29—29 of Fig. 23 and showing also the slot in which a single needle jack and a single selecting jack are received together in face-to-face relation;

Fig. 30 shows in side elevation and in edge view a form of needle jack to be used if the entire needle selecting attachment is working on the cylinder needles of the knitting machine;

Fig. 31 is a schematic view to show how the needle jack wipes past and moves inward the dial needle which is thereby placed in non-knitting position; and Fig. 32 is a similar schematic view to show how the needle jacks similarly act upon the cylinder needles if the needle selecting device herein disclosed is positioned to operate upon the cylinder needles instead of upon the dial needles.

Figure 5:
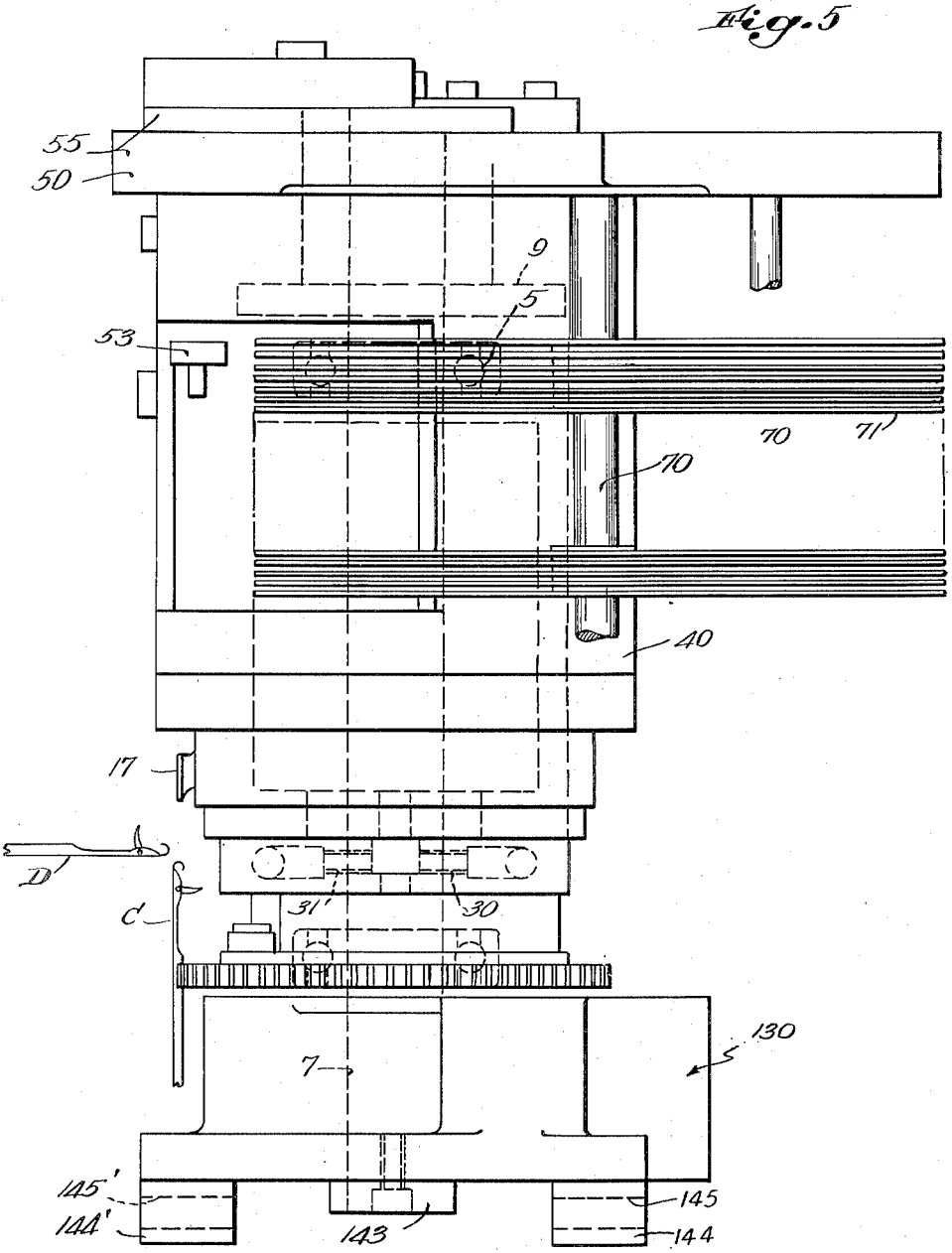
Fig. 5 is a side elevation of the needle jack and selecting jack cylinder in its relation to a dial needle and a cylinder needle in the knitting machine.

Referring more particularly to the drawings, and first to Fig. 6, the needle selecting attachment or device herein shown as for selecting dial needles, but which can be adapted to selecting cylinder needles, includes a cylinder 1 for the reception of jacks, to be described, lengthwise slidable and workable, said cylinder having at the lower end thereof a gear 2. The cylinder 1 is provided throughout its circumference with lengthwise slots 3. The upper ends of said slots 3 merge into a cut away portion 4 where the said cylinder 1 is hollowed out at its top, as best shown in said Fig. 6.

The said cylinder 1 is mounted at its opposite ends on ball bearings 5, 5' for rotation about its axis. The said gear 2 is mounted on a collar 6 adjustably connected to said cylinder 1 at the lower end thereof, as shown in said Fig. 6.

The cylinder 1 is received and supported upon a stationary shaft 7. A beveled edge, hardened disk 8 is fastened to the upper end of the cylinder 1 so that the greatest diameter of said disk corresponds with and is set in line with the bottoms of the said jack receiving slots 3. Thus when a needle or a selecting jack is in its upper position, as will be explained, its butt may be moved radially inward into the said cylinder 1, the jack moving about its fulcrum.

Above the beveled disk 8 is a cam 9 to be more fully described and which is held against rotation by reason of the fact that it is fastened to the cap at the upper end of the cylinder 1.

As already stated, normally each slot 3 of the cylinder 1 contains in face-to-face relation a needle jack 10 and a selecting jack 11, both shown in detail in Figs. 23, 24, 25 and 28.

As shown in Fig. 25, the selecting jack 11 is to the observer's left of the companion needle jack 10. Each needle jack 10 near its lower end has a fulcrum 12 about which it swings or rocks as will be explained, and each selecting jack 11 has near its lower end a fulcrum 13 about which it swings or rocks.

Each needle jack 10 has a folded over upper end 14, the top of the jack being folded over upon itself so as to fill that part of the slot 3 of the cylinder 1. Each needle jack 10 has near its upper end a butt 14a, and when the needle jack 10 is in its upper position the said butt 14a may be moved radially inward in the cylinder 1, the said needle jack 10 swinging about its fulcrum 12.

Each selecting jack 11 has near its upper end a butt 15. As will be later explained, the butts 14a and 15, when the jacks 10 and 11 are pushed radially inward, will pass in back of certain cams carried, as will be explained, upon the inside of a long sleeve surrounding but unattached to the cylinder 1.

Each needle jack 10 has a butt 15a near its lower end and each selecting jack 11 has near its lower end a butt 16.

Each needle jack 10 has at its lower end opposite its fulcrum 12 a butt 16a.

Each selecting jack has certain selecting butts 16b for selecting purposes, as will be described in detail at a subsequent point herein.

Each butt 16a at the bottom of each needle jack 10 is provided with a right angle bent portion 17, which, as shown in detail view Fig. 29, is slightly longitudinally grooved so as best to co-operate with the outer end of the hooks of the dial needles with which it comes into contact, to push each radially inward in its slot.

Each selecting jack 11 has an upstanding portion 17a that contacts edgewise with the folded over top end 14 of the needle jack 10, when such selecting jack 11 is moved about its fulcrum 13. When a selecting cam, to be described, contacts with one of the butts of the group of butts 16b, and thus when a selecting jack 11 is moved radially inward at its top, the companion needle jack 10 is also moved radially inward.

Each needle jack 10 has a heel or extending cam formation 18, and when the needle jack 10 is in its upper position, the said heel 18 extends in through its slot in the cylinder 1, and as the needle jack 10 is lowered, its heel 18 is cammed out by the bevel referred to on the disk 8 to line up with the bottom of the slots in the cylinder 1. Thus when a needle jack 10 is in its upper position, its upper butt 14a may be moved radially inward in the cylinder 1, such needle jack 10 swinging about its fulcrum 12.

Each selecting jack 11 has a shoulder 18a below its upstanding portion 17a.

In addition to the needle jacks 10 and the selecting jacks 11, there are pattern jacks 19 shown in Fig. 26 and which are held in slots in the upper or larger pattern drum, to be referred to, and there are also short pattern jacks 19a shown in Fig. 27 and which are respectively held in slots in the lowermost of the said two drums, to be described in detail.

The action of these parts will be subsequently described.

There will next be referred to certain details of construction best shown in Figs. 3, 4, 7 and 9.

Above the cap of the needle selecting attachment or device, and as shown in said Figs. 3 and 4, is a lever 20 which has a screw 21 threaded into it and locked in position by a nut 22. The end of the screw 21 projects through the lever 20 and rests on or contacts with the cam surface of a lever 23. Said lever 23 is constructed so that it can be rotated about a stud 24 by a Bowden wire 24a, to be more fully referred to.

The said Bowden wire 24a is operated, as shown, from the main control drum on the knitting machine and which control drum is shown in Figs. 1 and 2. The said Bowden wire 24a may be attached to either end of the said lever 23 to move it positively against a spring tension, not shown. The movement of the lever 23 transmits movement to the lever 20 through the screw 21 resting, as stated, on the cam surface of the lever 23.

In this manner, it is possible to control the needle jacks 10 and the selecting jacks 11 from the master control on the knitting machine, so that the said jacks will follow an active or inactive path, causing all needles to tuck or to knit, depending upon the path the said jacks follow.

Above the said cap of the needle selecting attachment or device is pivoted a lever 25, above a gear to be referred to. An adjusting screw 26 upon one end of the lever 25 is locked therein by a nut 27. The said screw 26 rests against a stud upon which there is an idler gear, thereby limiting the outward position of a cam, to be fully described, thereby limiting the outward position of said cam against the heels or extending cam formations 18 of the needle jacks 10.

At a point nearly at a right angle from the said adjusting screw 26 is a stud 28. The free end of a lever, to be more fully referred to, pushes against the said stud 28, thereby to operate such cam, through a series of levers from the lowermost of the said two pattern drums, to cause all the jacks 10 and 11 to follow an active path. This series of levers will be subsequently described in detail.

Extending up through the said cap at the upper end of cylinder 1 is a shaft 29 and it is fastened to the cam just referred to and which, as will be explained, acts on the heels or extending cam formations 18 of the needle jacks 10.

The gear 2, mounted, as stated, upon the collar 6, is adjustably connected to the said cylinder 1 through screws 30, 31, shown most clearly in Figs. 4 and 5, and which bear against the pin 32, which in turn is pressed into a hole in the lower edge of the said cylinder 1.

Around the slotted cylinder 1 is fitted a long sleeve 40, shown in Figs. 4, 5 and 6. Secured to the inner face of said sleeve 40 are three cams 41, 42 and 43 shown laid out or developed in Fig. 20. The said cams 41, 42 and 43 operate upon selected needle jacks 10 to move them longitudinally in their slots 3. Also fastened, as an extension of said cylinder 40 at its lower end, is a ring 44 upon the inner surface of which are fastened cams 45, 46 and 47, as shown in Fig. 20, the said cams 45, 46 and 47 being shown laid out or developed in Fig. 20. The said cams 45 and 46 are also secured to the sleeve 40, thereby fastening the ring 44 to the said sleeve 40.

The purpose of the cams 45, 46 and 47 is to return the needle jacks 10 and the selecting jacks 11 to their uppermost position by acting on their respective butts 15a and 16, shown in Figs. 23 and 24.

The cams 41, 42 and 43, and also the cams 45, 46 and 47, are, of course, all outside of the said needle jacks 10 and selecting jacks 11.

The said sleeve 40 and the said ring 44 are held in position about the said cylinder 1 by means of screws 49 (Fig. 6) passing through a long depending flange 51 upon the cap 50, previously referred to and upon the upper surface of which are positioned the said cam lever 20, the lever 23, and the lever 25. As already stated, the shaft 29 extends up through the said cap 50. Other parts, yet to be referred to are positioned at the upper surface of the said cap 50.

The said cap 50 is fastened to the stationary shaft 7 already described and best shown in Fig. 6.

The said cap 50, in addition to providing a fastening for the sleeve 40, carries at its upper surface jack operating cams 52, 52a and 53, best shown in Figs. 3, 4, 7, and 9, and whose function will be described later. The said cap 50 also provides support, through bearing 54 for a vertical shaft, to be referred to, and which supports a series of certain selecting cam levers, to be described.

Also at the upper surface of the cap 50 are gears 55, 56 and 57, the gear 56 being an idler meshing with both gears 55 and 57, which are respectively fastened to the stud 59 and the sleeve 58 at the top of the cap 50. The cams 52 and 53 are also respectively mounted on the said sleeve 58 and the stud 59, which both project up through the cap 50. Because of the gears 55, 56 and 57, when the cam 52 moves, the cam 53 must also move. The cam 52a operates on the butts, heels or extending cam formations 18 of the needle jacks 10 the same as does cam 52. Thus the needle jacks 10 will be moved outward to ride down cam 42 either by cam 52 or cam 52a.

Above the said gear 55 is mounted the cam lever 20, already referred to, and which, in turn, is fastened to stud 59.

The said cap 50 is fastened to the stationary shaft 7 by screw 60, as shown in Figs. 5 and 6, and which bears against key 61, which in turn prevents the said cap 50 from rotating about shaft 7. The cap 50 is located vertically on the said shaft 7 by means of screw 62, which in turn is locked in position by nut 63.

Upon the cap 50 is secured a bracket 64 in a hole in which is mounted a shaft, to be referred to. The bracket 64 is held to the cap 50 by means of screws. The bracket 64 is provided with ears 65, 65'.

The vertical, stationary shaft 70 is supported at its upper end in the bearing 54 previously referred to in the cap 50. The said shaft 70 provides a support for a vertically arranged series of selecting cams 71, each of lever construction, as best shown in Figs. 4, 5 and 7, and subsequently referred to as cam levers.

The said cam levers 71 have cam ends 72, which can operate on the selecting butts 16b of the selecting jacks 11, Fig. 24, for selecting purposes, which will be explained in detail subsequently herein. The said selecting cam levers 71 also have, each, a reading end 73 acted on by a pattern jack 19, held in slots in the upper of the two pattern drums to be referred to.

The said shafts 7 and 70 are supported at their lower ends in a manner to be referred to.

Beyond each cam end 72 of each of the cam levers 71 is a notch 74. An adjustable stop 75, shown in Fig. 7 is provided, that limits the inward movement of the cam levers 71, thereby preventing them from pressing with too much force against the butts 16b. Such stop has a series of blades (not shown) that project between the cam levers 71 respectively to align their ends 72 with the butts 16b on the jacks 11. The said stop 75 has a cross section somewhat in the form of a Z, and as shown in Figs. 3 and 7 it is fastened to a bracket 76 by a bolt 77. The bracket 76 is in turn fastened to the cap 50 by screws and is pinned in position to prevent movement. Adjusting screws 78 in the stop 75 accurately position the said stop.

A shaft 80, as best shown in Fig. 3, is mounted in the bracket 64, previously referred to as on the cap 50.

There are two pattern drums in the selecting mechanism or apparatus, capable of use in making patterns, namely, the main pattern drum 81, having about its periphery vertical slots 82, and a shorter auxiliary pattern drum 83 directly underneath the main pattern drum 81 and rotatable about an axis in the same line. Each of these pattern drums 81 and 83 has a ratchet disk, containing, in the present disclosure or example, 96 teeth. The ratchet disk 84 for the main pattern drum 81 is fastened thereto, while the ratchet disk 85, that may contain both deep and shallow teeth, is fastened to the auxiliary pattern drum 83. The details of the auxiliary pattern drum are best shown in Figs. 12 to 17.

The bracket 64, previously referred to, has a hole therethrough, and a screw 87 is provided in said hole to hold in position the said shaft 80.

A plate 88 fits between the main pattern drum 81 and its ratchet disk 84 and it is held securely therebetween, as the ratchet 84 is screwed tight against the pattern drum 81. A plate 88' is similarly fastened between the ratchet disk 85 and the auxiliary pattern drum 83. Each of the said plates 88 and 88' is made so that its circumferential surface will be inside the root of the ratchet teeth except at one point where they are enlarged to a radius beyond the ratchet tip radius for a distance of one tooth or of a few teeth.

A short shaft 90, as best shown in Figs. 4 and 8, is mounted in a hole in the base, to be more particularly referred to, and is held stationary and solid in the said base by means of a screw 91a.

Reference has been made to the bracket 64 as held to the cap 50, and in the assembly the hole above referred to, is placed in vertical alignment with a hole 92 in the said base, and then the bracket 64 is pinned in position against movement. This construction insures that a shaft 93, best shown in Fig. 8 and which is above and in line with the shaft 90, will be held in true alignment with said shaft 90, forming in effect a continuation of shaft 90, while at the same time the shaft 93 and the said main pattern drum 81 may be readily removed by loosening the screw 87 and sliding the shaft 80 up out of engagement with the said shaft 93. Such construction allows the ready substitution for the main pattern drum 81 of another drum of the same type, but containing pattern jacks 19 having a different pattern cut out from their butts.

The shaft 93 is held from rotation by a bracket to be referred to, and which is fastened to the shaft 93 by a screw having a right angle projection that protrudes through the ears 65, 65' on the bracket 64.

The shaft 90 ends at a level about even with the bottom of the said ratchet disk 85. The second shaft 93 fits the top of a collar 94 which extends beyond the short shaft 90, to which it is fastened by a screw 95. The collar 94 is equipped with fiber plungers 96 that are pushed outward by compression springs, in order to friction the auxiliary pattern drum 83 and prevent its jumping ahead when racked. The screw 95 sets into a flat provided near the top of said shaft 90.

The shaft 93 is thus held at the bottom concentric with the central axis of the shaft 90 and forms a continuation of the said shaft 90. The shaft 93 continues up through the main pattern drum 81 and extends beyond the top of said main drum 81. The upper end of shaft 93 has a hole drilled in it concentric with its axis, and the shaft 80 has a turned tip that fits accurately into the hole in shaft 93.

A fiber plunger, to be referred to, provides friction to prevent overthrow movements of drum 81 during racking and also holds the said pattern drum 81 down against the collar 94, fastened as stated to the shaft 90 by the screw 95, and is in turn supported against downward movement by a collar 98, which is fastened onto the shaft 90, as shown in Fig. 8.

The travel of the jacks 10 and 11 is indicated by the arrow in Fig. 20 as from left to right. At about the broken vertical line X—X in said Fig. 20, both jacks 10 and 11 are at their highest level and jacks 10 and consequently also jacks 11 have been moved out from center in their slots in cylinder 1 by the disk cam 9, Figs. 7 and 9, that, as already described, is fastened against rotation to the cap 50 and which is adapted to contact with the heels or extending cam formations 18 of the jacks 10 at approximately the broken vertical line Y—Y in Fig. 20, and thus to move the jacks 10 and 11 outward in their slots so that the butts 14a of the needle jacks 10 will come under the cam 43, Fig. 20. The jacks 10 and 11 are held in such outward position by the said cam 9 until after said jacks have been precisely leveled by passing under the projected surface 48 of the cam 41. Thereafter, the jacks 10 and 11 are held in place by a slight friction between them and the sides of their slots, due to putting a slight bend in the jacks 10 or jacks 11, herein in the jacks 10, and which is indicated in Fig. 23.

When the jacks reach the point indicated by the said line X—X, some jacks 10 and 11 are pushed radially in, as has been described, so that their butts 14a and 15 pass in back of the cams 42 and 43, and therefore are not acted on by the said cams 42 and 43. Such action serves to hook the heels or extending cam formations 18 of the needle jacks 10 over the disk 3, Fig. 6 so that such jacks cannot then move downward since their butts 14a are behind the said cam 42. On the other hand, if a selecting jack 11 is not pushed back, the butt 14a of the companion needle jack 10 will contact with the downwardly sloping edge of the cam 42, thus causing such jack to descend, its heel or extending cam formation 18 riding at the back of the slot therefor in cylinder 1, thus insuring that the butt 14a will remain in contact with the cam 42 throughout its downward motion, so as to give it a full movement. The companion selecting jack 11 will be moved down also, due to the bottom edge of the folded over upper end 14 contacting with the shoulder 18a of the selecting jack 11. Overtravel of the jacks 10 and 11 is prevented because their butts 15a and 16 contact with the cam 46, Fig. 20.

We have in Figs. 5 and 6 indicated a positioned cylinder needle at C and a positioned dial needle at D.

As soon as a dial needle D is pushed in, to its furthest extent, by the described action of a needle jack 10 having the heel 16a and its bent portion 17, the jacks 10 and 11 will start to rise because of the contact of their butts 15a and 16 with the upwardly sloping edge of the cam 46. Thereafter the needle jacks 10 and the selecting jacks 11 are repositioned for another selection.

In Fig. 20 the idle path of the jacks 10 and 11 is indicated at 100 and the active path at 101.

For selecting purposes, the needle jacks 10 and the selecting jacks 11 may all be moved inward in their cylinder 1 about their fulcrums 12 and 13 by means of the said cam 53, Figs. 7 and 9, and such action of the needle jacks 10 and selecting jacks 11 prevents them from riding down the cam 42, so as to contact with dial needles D. On the contrary, the needle jacks 10 and selecting jacks 11 move so that their butts 14a and 15 will ride in back of the cam 42, thus forcing all needle jacks 10 and selecting jacks 11 to ride high, that is, to follow the idle path 100 shown by dotted lines on cams 42 and 43, Fig. 20. If, however, it is desired that all needle jacks 10 and selecting jacks 11 should follow on the active path 101, under the cam 42, thereby to cause all dial needles D to be moved into a non-knitting path, as described, then cam 52 is moved to an outward position, as shown in heavy dotted lines in Fig. 7. The cams 53 and 52 are, as has been described, interconnected by the gears 55, 56 and 57 (Figs. 1, 3 and 4) and this insures that when the cam 53 is in operating position, the cam 52 will be in non-operating position, and vice versa. The said cam 52 operates on the heels or extending cam formations 18 of the needle jacks 10, where such heels 18 project through the cylinder 1.

The cams 52 and 53 have a neutral position, and when in this neutral position, the cams 52 and 53 will not contact with the needle jacks 10 and the selecting jacks 11, but instead will let them pass regardless of whether their butts 14a and 15 are in an outward or in an inward position with respect to the surface of the said cylinder 1.

As already briefly stated, the selecting jacks 11 each has a series of selecting butts 16b. In the herein disclosed embodiment or example of the invention, there are twenty-six such butts. Obviously, there could be more or less.

There is a selecting cam lever 71, corresponding to each level of butts 16b, as shown in Figs. 4 and 5. Butts 16b may be removed by cutting or breaking off, and usually only one or two such butts are left on a selecting jack 11, depending upon the pattern desired.

When a selecting cam lever 71 is in its full line position, as shown in Fig. 7, its end 72 will contact with the butts 16b of all selecting jacks 11 that are at its level. Such contact moves any such selecting jack 11 inward, and consequently moving the companion needle jack 10 inward, by reason of the projection 17a on the selecting jack 11 contacting with the folded over top end 14 of the corresponding needle jack 10, whereby each pair of the jacks 10 and 11 is in effect a single jack as if a unit including the heel or extending cam formation 18.

The said cam levers 71 are, as already described, mounted on the shaft 70 for rotative movement about such shaft, so that said cam levers 71 may be moved to inactive position. When any cam levers 71 are in active position, as stated, selecting jacks 11 having butts 16b at the levels of such active cam levers 71, are pushed inward in their slots 3 in cylinder 1, and thus follow the idle, dotted line path 100 shown on Fig. 20, provided, however, that the cams 52 and 53 are in their described neutral position. Since the cams 52 and 53 operate on the needle jacks 10 and selecting jacks 11, after they pass the cam levers 71, such cams 52 and 53, if not in a neutral position, will determine what path the said jacks 10 and 11 will follow, regardless of the position of the cam levers 71.

As already explained, it is possible by the apparatus or needle selecting attachment herein disclosed, to control the needle jacks 10 and the selecting jacks 11 from the master control on the knitting machine, so that such jacks will follow an active or an inactive path, thereby causing all needles to tuck or knit, depending on which path the said jack pairs or dual units 10 and 11 follow.

Figure 5A:
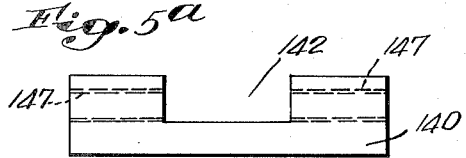
Fig. 5A is a detail in perspective of the so-called "adapter" for detachably mounting the dial needle selecting apparatus in operative position.

The lower ends of the shafts 7 and 70 are fastened into a base 130 of the attachment or apparatus, as shown in Fig. 4 only, and the said base 130, in turn, fits into and is fastened to what I term an adapter, Figs. 5, 5a and 6, since because of it, I can very quickly convert, as already referred to, a circular latch needle knitting machine capable of making only plain work, or only very simple designs, into one capable of making very complex designs, and enabling the same machine to be quickly converted back into a plain machine.

Such adapter is shown at 140 in Figs. 5, 5a and 6. The adapter is desirably permanently fastened to the base B of the knitting machine itself by means of screws 141 and 141'.

The adapter 140 has a key way 142 made to receive a key 143 fastened to the said base 130 of the attachment, in accurate fitting relationship. The said adapter 140 is, as stated, fastened to the base B of the knitting machine so that the center line of the key way 142 will be along a radius line drawn from the axial center of the knitting machine. Depending ears 144 and 144' extending from the said base 130 are slotted, as shown at 145 and 145', to receive screws 146 that fit into threaded holes 147 in the said adapter 140, to secure the said base 130. The slots 145 permit the entire needle selecting mechanism, apparatus or device to be set into or removed out of action readily, for the purpose of making adjustments to the knitting machine or to the selecting mechanism, apparatus or device, or to change the knitting machine from one capable of making very complex designs to a machine capable of making only plain work or of making very simple designs.

The removal of the screws 146 permits the ready removal of the whole selecting apparatus, mechanism or device.

*Dial needle operation*

In Fig. 21 is illustrated a set of dial needle cams that may be used in co-operation with the dial needle selecting apparatus, mechanism or device herein disclosed.

Each dial needle, such as D in Figs. 5 and 6 is moved by cams operating on its butt through the normal knitting cycle when not acted upon by a needle jack 10. In Fig. 21 the dial needles are moving in the direction shown by arrow A in said Fig. 21. The dial needles are drawn into stitch measuring depth by stitch cams such as 150 or 150' when they reach the point 151. Thereafter they are moved through stitch casting position which follows closely stitch drawing point 151 or as the needle rides the cam 152 where camming angle 153 moves the head of the dial needle out even with the edges of the dial. Each dial needle D continues out on cam angle 153 to tuck position, which is where the stitch on the needle moves to the spoon of the latch. The dial needle D is then withdrawn slightly by the cam angle 155 on the cam 154, to put the needle in equilibrium, or in other words, in a position where the stitch hangs straight down from the edge of the dial and thus has no tendency to move the needle.

The dial needle D is now in position where its head or outer end of the hook can be contacted by the right angle bent portion 17 of needle jack 10. If such contact follows, the dial needle D will be pushed back in its slot in the dial, and its butt will follow a path that will bring it to the inner side 161 of cam 160, and so will not knit. If the dial needle D is not contacted by a needle jack 10, its butt will then ride on the outer side 162 of the cam 160 and will ride out to clearing distance at 163 on cam 160. Dial needles pushed in by needle jacks 10 will contact the cam 156, which can be rotated about its center 157 to such position as to clear these needles, move them to tuck position where they take the yarn but do not knit, or leave them in welt position where they miss the yarn and, of course, do not knit.

Knitting machines of the type adapted to receive a selecting mechanism or apparatus such as herein disclosed frequently have several knitting stations. So-called "memory" and cross over devices to carry selections made at one feed over to following feeds are known for both dial and cylinder needles, and may be used with the needle selecting apparatus, mechanism or device herein disclosed, to avoid the necessity of putting one of them at each feed.

While have specifically described and illustrated the selecting apparatus, mechanism or device as for the purpose of selecting dial needles, it can be used to select cylinder latch needles or cylinder latch needle jacks. For operating upon cylinder latch needles it can be arranged to operate on the heads of such cylinder needles, to push them down in their slots, by using jacks as shown in Fig. 30, and delaying the downward sloping surface of cam 42 so that the needle jack will start down when it is over the head of the cylinder needle, or it can be caused to operate on the butts of the cylinder needles by having the upper part at 17 of the needle jacks 10 move underneath the cylinder needle butts, and at the appropriate time to lift the cylinder needles through hooking under the butts as the needle jacks 10 are raised back to inactive level. Furthermore, the bent portions 17 of the needle jacks 10 may directly contact or contact through intermediate racking jacks (as in the Scott and Williams spiral), under cylinder needles for selection purposes.

We have in Fig. 30 represented a needle jack particularly adapted to be used to select cylinder needles as herein described.

In said Fig. 30 we have represented both in edge view and in side elevation the needle jack 10 having at the lower end the right-angled bent portion 17, which, according to the preferred manner of operation, will move over the tops of the cylinder needles that are not to clear their stitches and knit, and at the appropriate time push them down so their butts will go under a dividing cam, similar to dividing cam 160 used for dial needles, and thence will miss the yarn or tuck in a manner similar to that described for the dial needles while those cylinder needles not pushed down will clear their latches and knit.

Within the scope of my invention, and if the pattern controlling means is so constructed and positioned as to act upon the cylinder needles, we may, by means of the described jacks, move the needles down out of action that are not to take the yarn or thread.

Whether the pattern controlling means is so constructed as to act upon dial needles or upon cylinder needles, it is removably mounted upon framing of the knitting machine in substantially the manner already described.

Jack operation

As already explained, the cylinder 1 contains a multiplicity of lengthwise extending slots 3 about its periphery, each of which is normally filled with one needle jack 10 and one selecting jack 11, side by side, as a combinational pair or unit, as shown in Figs. 25 and 28. The cylinder 1 is rotated about shaft 7 on the ball bearings 5 and 5', by means of gear 2, which meshes into the shanks of the cylinder needles C where the needle cylinder is cut away between that part used as a bed (where the butts travel under influence of the cams) and the upper part of the cylinder which acts as a verge and over which the stitches are drawn. Thus the gear 2 will contain the same number of teeth as there are slots in the cylinder 1.

Usually the number of teeth in the gear 2 will divide evenly into the number of needles in the cylinder. In the disclosed embodiment or example of the invention there are four times as many cylinder needles as there are teeth in the gear 2. Therefore the cylinder 1 will turn four times for each revolution of the needle cylinder. The diameter of the gear 2 will be somewhat larger than one fourth the diameter through the cylinder needles. The reason for this is that the dial needles when first contacted are at a radius at least three sixteenths greater, in the present embodiment or example, than the radius from needle cylinder center to the middle of the shank of the cylinder needle.

The dial needles D are pushed in until their heads are about even with the center of the shank of the cylinder needle. From this it will be evident that, mathematically, the dimensions of gear 2 should be larger than one fourth the diameter, or the distance across the circle to the needle shanks of the opposite cylinder needles, in order to attain minimum slippage between the needle heads and the needle jacks as the needles are pushed in, and such a determination for minimum slippage can be readily ascertained mathematically by well-known methods, given the diameter of the cylinder at the cylinder needle shanks and the distance the dial needles are to be moved.

At 170, as shown most clearly in Figs. 18 and 19, is a cam fast upon the upper end of a vertical shaft 171 that extends up through the cap 50 upon the said cylinder that receives the needle jacks and the selecting jacks in the slots thereof. The said shaft 171 is supported near its lower end by a bearing attached to the bracket 76 previously referred to.

Attached to the lower end of said shaft 171 is a lever 172, and depending from the end of said lever 172 is a pin 173 against which is received a lever 174 that is mounted for rocking movement on the shaft 70 at the lower end thereof, below the entire series of cam levers 71, as best shown in Figs. 4, 5, 18 and 19. The said lever 174 can push against the said pin 173, as best shown in Figs. 18 and 19, so as to rotate said shaft 171 contra-clockwise, thereby moving from active to neutral position the cam 52a previously referred to, and which is fast upon the shaft 29 underneath the cam 52 and which is moved by certain butts upon jacks 19a. Such cam 52a operates on the heels or extending cam formations 18 of the needle jacks 10, just as does the cam 52. Thus the needle jacks 10 may all be moved outward to ride down the cam 42 (Fig. 20) by said cam 52 or the said cam 52a upon the shaft 29 beneath the cam 52.

The screw 26 is, as stated, locked by the nut 27, and rests against the stud upon which the idler gear 56 turns, thereby limiting the outward position of the said cam 52a against the heels or extending cam formations 18 of the needle jacks 10.

The free end of the said cam 170 on shaft 171 pushes against the stud 28, thereby to operate the said cam 52a through a series of levers from the drum 83, to cause all the jacks 10 and 11 to follow an active path.

The said lever 174 has a reading end 175, shown in Fig. 19, which is in line with the reading ends 73 of the series of cam levers 71, as shown in Fig. 7. However, the reading end 175 of the said lever 174 is operated upon by a short pattern jack 19a, Figs. 8 and 27, held, as stated, in the slots of the smaller pattern drum 83.

A second lever 176 (Fig. 18) is also operated upon by a short jack 19a in the said pattern drum 83. The said lever 176 is mounted for rotation on the shaft 70 and is made rigid with a plate 177 attached to the lever 176 whose shape is similar to that of the cam levers 71, which are also mounted on said shaft 70. Said lever 176 is mounted for rotation on the shaft 70 through an upright connecting stud 178 shown in Figs. 18, 19. The operating end of the said lever 176 is of the same shape as the operating ends 72 of the lever cams 71. However, the operating end of the lever 176 with the plate 177 attached thereto, presses on the butts 14a and 15 of the needle jacks 10 and the selecting jacks 11, whereas the cam levers 71 press on the butts 16b of the selecting jacks 11. Movement of lever 176 and attached plate 177 from the short jacks 19a in the short pattern drum 83, causes all the needle jacks 10 and the selecting jacks 11 to follow the idle or upper path 100 of Fig. 20, when the said lever 176 is not resting on a butt of a jack 19a, or assumes a neutral position with respect to the needle jacks 10 and the selecting jacks 11, when resting on one of the two butts of a jack 19a. The other butt on a pattern jack 19a moves the said cam 52a into an inactive position by causing the said lever 174 to move about the shaft 70.

The shaft 93 is held from rotation by a bracket 180, shown in Fig. 4, and which is fastened to the shaft 93 by a screw 181 and has a right angle projection that protrudes through the ears 65 and 65' in bracket 64.

The bracket 180 has a fiber plunger 182 that is held against the top of the large pattern drum 81 by a coiled spring 183, compressed by a screw 184. The said fiber plunger provides a friction to prevent overthrow movements of the pattern drum 81 during racking, and it also holds the said pattern drum 81 down against the collar 94 fastened, as stated, to the shaft 90 by screw 95.

Figure 10:
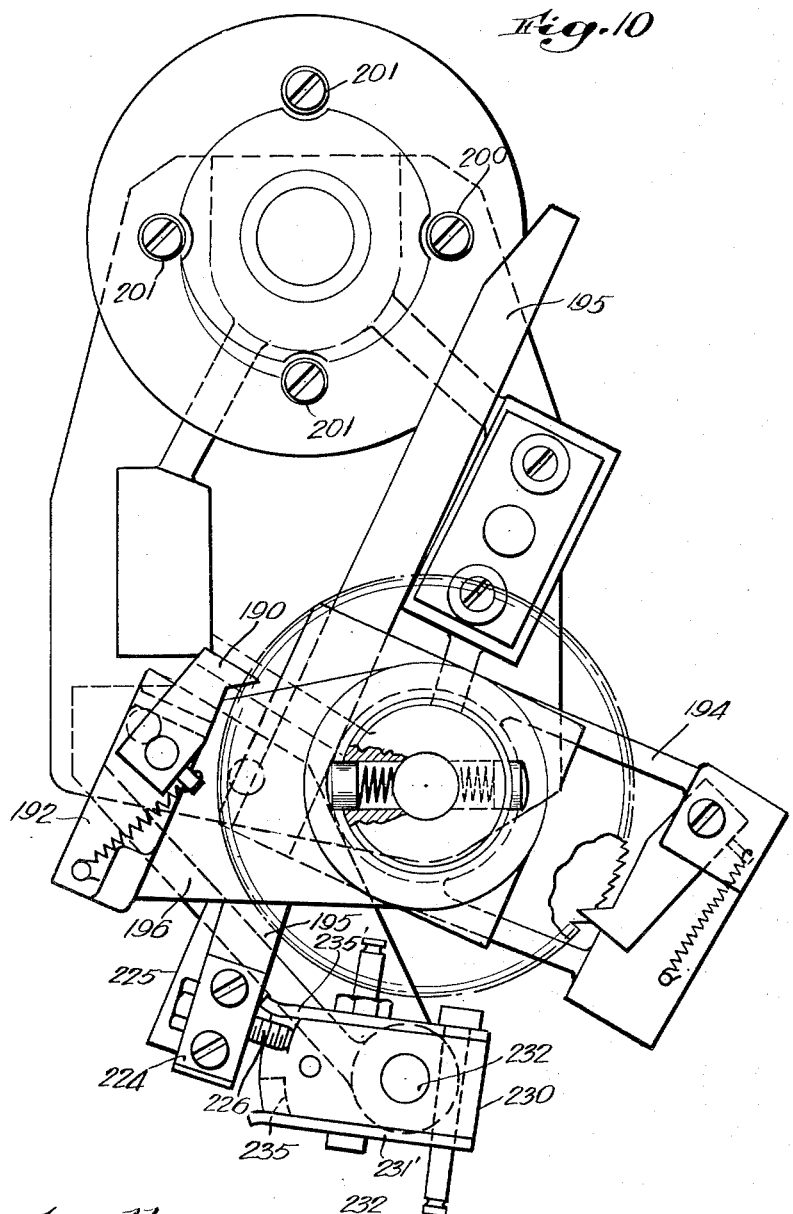
Fig. 10 is a horizontal section taken just above the ratchet for the lower pattern drum, the wheel being removed from said lower pattern drum so as to show the friction plugs for the said lower pattern drum and showing adjacent parts in plan.

Referring now particularly to Figs. 4, 8, 10 and 11, the two ratchets 84 and 85 upon the pattern drums 81 and 83 are racked around by a pawl 190 or by retiming pawls 191 and 191'. The pawl 190 is mounted on a casting 192 in such a manner that it may be adjusted to move the said ratchets 84 and 85 to a position where the pattern jacks in the respective pattern drums 81 and 83 will be in proper relation to the reading ends of the selecting cam levers 71. A lever arm 195 is mounted on and is fast to a bracket 196, on which casting 192 is mounted, and said lever arm 195 oscillates said bracket 196 as said lever arm 195 rides on a long roll 200 fastened to the gear 2. The said roll 200 is best shown in Fig. 10.

As shown in Fig. 4, the pawl 190 is made wide enough to operate on both ratchets 84 and 85. As already stated, the ratchet 85 has both deep and shallow teeth. The shallow teeth in ratchet 85 hold said pawl 190 away from ratchet 84. Thus the pawl 190 can move the ratchet 84 only when it rests in a deep tooth in a ratchet 85. When, as herein shown, there is but one long roll 200 upon the gear 2, and such gear 2 makes four revolutions for one revolution of the needle cylinder, it is still possible to move the ratchet 84 one tooth for every revolution of the needle cylinder, simply by providing three shallow teeth between each deep tooth on the ratchet 85, or two deep teeth followed by six shallow teeth, as shown, if two long rolls are used.

It has been stated previously that the collar 94 is supported vertically against slipping downward on the shaft 90 by the collar 98, which in turn is pinned to the shaft 90 so as to become a solid part of the said shaft 90. However, the collar 98 has a reduced diameter where it contacts with the collar 94. An annular plate 220, as best shown in Fig. 8, fits around the reduced diameter, the thickness of the plate 220 being slightly less than the height of the reduced portion of the collar 98; thus, even when the collar 98 is placed solidly against the collar 94, the said plate 220 will be free to rotate about the reduced portion of the said collar 98.

Flat head screws 221 fasten the plate 220 to a bracket 196, thus holding such bracket in position. The said bracket 196 is made with a hole that fits over a turned projection at the top of a casting 223, which latter casting fits over and turns about the shaft 90 and is supported vertically by the base 130. This construction insures that both the bracket 196 and casting 223 will be free to turn, and the turning of one will have very little influence on the other. The lever 195, previously referred to, is fastened to the bracket 196, and an adjacent and similar lever 195' is fastened to the casting 223, whereby the said bracket 196 and casting 223 are oscillated about their common axis on the shaft 90 by the rolls 200 and 201 on the gear 2. The pawl 190, whose function has heretofore been described, is mounted on the bracket 196, while the pawls 191 and 191' are mounted on their supports on the casting 223.

Figure 11:
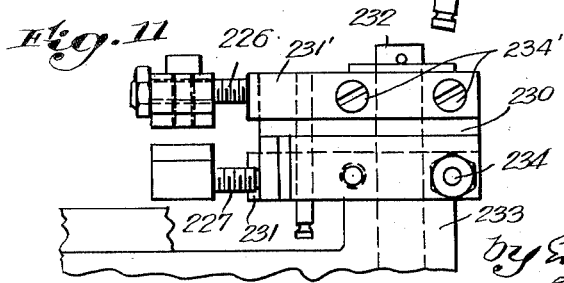
Fig. 11 is a detail in side elevation of the actuators for certain actuating pawls.

In this needle selecting mechanism herein described, either pawl 190 is active, or both pawls 191 and 191' are active, or both sets of such pawls are idle. It has been found unnecessary to have both sets active at the same time. The control that determines the activity or inactivity of the pawls 190, 191 and 191' is shown in Figs. 10 and 11. The ends of the levers 195 and 195' extend beyond the said bracket 196 and casting 223 to which they respectively are fastened. Blocks 224 and 225 are fastened respectively to the projecting ends of the levers 195 and 195'. Screws 226 and 227, locked in place by nuts, pass through the blocks 224 and 225 respectively, so as to project at approximately 90° to the levers 195 and 195'.

A block 230, best shown in Figs. 10 and 11, and having side pieces 231 and 231', is mounted so that it can swing about a shaft 232 which in turn is fastened to a casting 233 mounted upon the previously referred to base 130 and forming an extension thereof. Screws 234 and 234', which with their associated nuts hold the side pieces 231 and 231' to the block 230, extend out, one on each side, and form a convenient fastening for a spring Bowden wire, to be further described, and constitutes means to pivot the block 230 about its shaft. The face of the block 230, against which the screws 226 and 227 bear, is so cut away, as indicated at 235 and 235', that when the block 230 is turned to its fullest extent in either direction, one or the other of the said screws 226 or 227 can fall into a depression and thus allow the associated lever 195 or 195' to operate. The said side pieces 231 and 231' act as stops to prevent the said block 230 from turning too far in either direction. It will be noted that there is a space between the depressions 235 and 235' where the surface is full, and thus, when the block 230 is in a central position both levers 195 and 195' are held inactive. A Bowden wire that controls the block 230 is yieldingly connected to it, as through a spring, and such Bowden wire in turn is operated from the main drum on the knitting machine, as will be more fully referred to. Thus the main drum on the knitting machine can determine whether the pawl 190 or the pawls 191, 191' will be in action, providing prespectively for normal racking of the pattern drums 81 and 83, or providing a retiming action.

Retiming

The pawls 191 and 191' are used in retiming the pattern drums 81 and 83 respectively. The plate 88 previously described fits between the larger or main pattern drum 81 and its ratchet 84 is held securely therebetween, as the ratchet 84 is screwed tight against the said pattern drum 81. The plate 88' is similarly fastened between the ratchet 85 and the auxiliary or smaller pattern drum 83. Each of the said plates 88 and 88' is made so that their circumferential surfaces will be inside the root of the ratchet teeth excepting at one point where they are enlarged to a radius beyond the ratchet tip radius for a distance of one or a few teeth. The pawls 191 and 191' are so positioned as to cover the surface of their respective ratchets 84 and 85 and also to extend over the associated plates 88 and 88'. Thus when the pawls 191 and 191' are caused to become active they will each rack their respective pattern drum 81 or 83 only to the place where the projection on plates 88 and 88' each covers the teeth of the ratchet they operate on. The pawl 190 is wide enough so as to move both ratchets 84 and 85 and yet is still narrow enough so as not to extent over the plates 88 and 88' and thus is not affected by them.

However, the plates 88 and 88' provide means for assuring that the pattern drums 81 and 83 will always be retained to the same tooth when the pawls 191 and 191' are made active, thus assuring that each garment will be started at the same place in the pattern.

In Figs. 12 to 17 I have represented the smaller pattern drum 83. In Fig. 12 is represented in plan the ratchet 85 having therein the adjustment holes 85b that receive the points of the adjusting screws 85c shown in Figs. 15 and 17. As clearly appears in Figs. 12 and 16, there are one or more deep teeth at intervals between the shallow teeth upon the periphery of said ratchet as already explained. In Fig. 13 is shown in bottom plan view the so-called bluff reset cam 88' provided at one point with a cam or enlargement 88b. In Fig. 14 is shown the cylindrical portion of the drum provided about its periphery with slots to receive the short jacks 19a, the said cylindrical member being also shown in the exploded Fig. 15 and in part in Fig. 17. In order to hold together the several parts constituting the said pattern drum 83 there is provided, as shown in Figs. 15 and 17, a retaining ring 83c, through which passes a holding screw 83d.

As best shown in Fig. 17, there are provided two adjusting screws 85c received in threaded openings in the cylindrical member and having pointed upper ends that are received in holes in the plate or disk shown in Fig. 13 and which enter openings in the bluff or ratchet wheel 88'.

In order to effect a lateral or transverse adjustment of the said bluff or ratchet wheel, the screw 83d is loosened and then the screws 85c, whose pointed ends bear upon the edges of the holes 85b in the plate 85, are adjusted in or out as required. This effects lateral adjustment of the ratchet disc 85 in relation to the drum 83.

Operation

It has been fully described that the entire attachment, needle selecting apparatus, mechanism or unit device herein disclosed can be removed from a circular independent needle knitting machine by merely removing the two screws 146 best shown in Figs. 5, 5a and 6, one screw only being shown in Fig. 4. This permits the entire attachment or needle selecting apparatus, mechanism or unit device to be slid off from the adapter 140 that is permanently fastened to the base of the knitting machine and the disconnecting of the two connections to the main drum of the knitting machine, one of which connections operates the block 230 for starting and retiming the pattern drums 81 and 83, and the other connection controlling the lever 23, Figs. 1, 3, 7, which in turn eliminates the pattern by permitting all the needles to knit, tuck, or welt, depending upon what is desired, thus providing for a plain area where it is desired in the garment. The reinstallation of the attachment, unit device or apparatus involves the mere reversal of the acts or steps just specified, since the key 143 accurately locates the entire attachment or unit with regard to the knitting machine needles, and the gear 2 engaging with the cylinder needles, provides a limiting stop in toward the needle cylinder and at the same time aligns the dial needles of the knitting machine with the needle jacks 10.

Assuming that the attachment or device has been properly mounted on the knitting machine as described, for selecting dial needles, which are to be caused to pattern by being pushed in by the needle jacks 10, so as to ride in back of the dividing cam 160 (Fig. 21) and so not to knit, and then to ride out to tuck position on the cam 156, Fig. 21, while the unselected dial needles continue to knit, a typical garment may be made as follows. Let it be assumed that the garment is started from the bottom and is knit to the top. The garment may, however, be started from either top or bottom or, if preferred, the garments can be made so that one starts from the bottom and the next from the top, so as to have the bottom ends and the top ends knit together, which sometimes facilitates the cutting apart of the garments.

For the purpose of explanation, it will be assumed that the garment is begun with a plain band of knitting at the bottom, that is, that all the dial needles at the patterning feeds are knitting. Under these conditions the Bowden wire from the main drum of the knitting machine controlling the block 230, Figs. 10 and 11, will set such block 230 in its central position, in which case the levers 195 and 195' do not contact with rolls 200 or 201. Thus both the pattern drums 81 and 83 will be stationary, having been retimed at the end of the preceding garment so that the said pattern drums are in proper starting position. The Bowden wire controlling lever 23, Figs. 1 and 2, from the main drum of the knitting machine, is holding the said lever 23 in its extreme contra-clockwise position as seen in Fig. 3, thus holding the cam 53, Fig. 7, in its innermost position where it will move all the butts 14a and 15 of the needle jacks 10 and selecting jacks 11 inward so that they go in back of the cam 42, Fig. 20, and will follow the idle path 100 as shown.

For purposes of description, it will be assumed that there are two dial needle selecting attachments or units on the knitting machine, each being readily positioned in place as has been described. In placing two such attachments or units on a knitting machine, it is convenient to mark or remove one needle jack 10 from each unit, such jack being one that should strike the same dial needle, and such jack, of course, bearing the same relation in the two devices to the long roll 200. A dial needle opposite the marked jack 10 may also be removed so that it will be a simple matter to line up the removed jack in each unit device with this definite needle, thus insuring register of the pattern.

For a relatively simple pattern, such as a series of diamonds at the front of the garment only, the ratchet 85 will have three shallow teeth and one deep tooth. There will be one long roll 200 and three short rolls 201. The butts 16b on the selecting jacks 11 will be so cut and placed as to form a V in the cylinder 1. There can be any plurality of these V's and it will be assumed that there are two, each V covering 50 needles requiring 26 steps. It will be assumed that there are four hundred dial needles in the knitting machine and 100 cuts in the cylinder 1.

When the desired number of plain courses has been knit and it is desired to start the pattern, the Bowden wires controlling the blocks 230 on each machine will be moved from the main drum of the knitting machine, so that the said blocks 230 will swing contra-clockwise, as indicated in Fig. 10, to allow each lever 195 to contact with the long roll 200 of that unit. The said levers 195 are above the short rolls 201 and thus are unaffected by them. This permits the pawl 190 to start operating. Simultaneously the Bowden wire controlling the lever 23, Figs. 1 and 3, will operate to move such lever 23 clockwise, to a mid position, thereby permitting the screw 21, Fig. 3, to rest on the middle step, and thus placing the cams 52 and 53, Fig. 7, in a neutral position where they will permit the needle jacks 10 and the selecting jacks 11 to pass without influencing them, regardless of whether they are in their inner position or in their outer position.

The pattern drums 81 and 83 should be so set that the first racking move on one selecting attachment or unit will start with a deep tooth on the ratchet 85 for the auxiliary drum, thus moving both the smaller pattern drum 83 and the main pattern drum 81. On the other side of the knitting machine the racking for that unit will start with the second of three shallow teeth in the ratchet 85, and thus will move only the smaller or auxiliary pattern drum 83.

At the start of the pattern referred to, all of the selecting cam levers 71, Fig. 4, will be in active position, by which is meant that all of the selecting jacks 11 will be pressed in relative to the cylinder 1 by their butts 16b. At the first move of the main pattern drum 81 of the first unit or attachment, the top selecting cam lever 71 will be moved to inactive position, while on the other side of the knitting machine the top two selecting cam levers 71 will be moved to inoperative position, when its main pattern drum 81 moves, which will be a half revolution later of the needle cylinder and dial. With the pattern referred to, the best results are obtained if the pattern units are so timed with the needle cylinder that the pattern drums move when the operating ends 72 of the selecting lever cams 71 are in line with the middle or thirteenth level of the butts 16b, thereby allowing time for the top selecting lever cam 71 to be moved before a butt 16b reaches it. The second rack of the first pattern unit or attachment will be a shallow tooth, moving only the auxiliary pattern drum 83, which will allow the reading end of the lever 176, of the cam controlled by it, to move in, thus erasing, that is, discontinuing, the pattern. In this way, the diamond pattern is started and restricted to one fourth of the garment and will be placed in front thereof.

The lever 176, resting on the smaller or auxiliary drum 83 of the first mentioned unit or attachment, will rise onto one of the butts of an auxiliary jack 19a, thus moving the selecting cam that operates on the butts 14a and 15 of the needle jacks 10 and selecting jacks 11 to non-operating position, while the corresponding cam pertaining to the selecting unit at the other side of the knitting machine will remain in operation, thus insuring that all of the needle jacks 10 and the selecting jacks 11 follow the idle path 100 in the said second unit or attachment when the reading end 175 of lever 179 that controls lever 176, rises onto a butt of an auxiliary jack 19a, the said lever 176 is moved out of erasing position.

The main pattern drums 81 of the two units or attachments will continue to be racked throughout the length of the pattern area. The selecting lever 71, Fig. 4, falls in on the first rack of the first unit and is followed by the top three on the next rack, then the top five, and so forth, until the desired width of the diamond is obtained at, say, the top nine selecting levers 71, whereupon the number will diminish two at a time until all are out. In the meantime, on the second unit, the top lever cams 71 drop in on the first move; then the top four, and so on, until eight are in action, which eight will remain in for two racks and then will be withdrawn, two at a time, on succeeding racks. The next following diamonds can be staggered by starting with the bottom one of the selecting lever cams 71.

While a very simple pattern has thus been described, it will be evident to those skilled in the art that very complicated patterns may be made by the needle selecting attachment or unit herein disclosed.

At the end of the patterned area, the main drum on the knitting machine will move, operating the Bowden wire that controls the lever 23, Figs. 1 and 3, thereby to move it to its extreme contra-clockwise position, thus making cam 53, Fig. 4, active, and forcing all the needle jacks 10 and selecting jacks 11 to follow the inactive or idle path 100, thus making unpatterned ribbed fabric. At the same time, the block 230 of each unit or attachment may be operated by its Bowden wire to move it to its extreme clockwise position, allowing the lever 195', Fig. 10, to be actuated by the four rolls, namely, one 200 and three 201 rolls. If the pattern drums 81 and 83 have each ninety-six teeth in their ratchets, they will be completely retimed at the rate of sixteen teeth per complete revolution of the knitting machine, that is, in six revolutions.

When the top of the garment is reached, the lever 23, Figs. 1 and 3, of one or both units may be moved to its extreme clockwise position for one revolution, thus making a revolution of tucks for a cutting line. The block 230, Fig. 10, may also be moved at this time to its central position where it will stop levers 195 and 195' from being actuated by the rolls 200 and 201.

The ready removability of the unit or attachment for producing so-called "fancies" on an otherwise plain or rib knitting machine is an important feature. Increasing numbers of new materials are being placed on the market, and the ingenuity of the knitter is frequently taxed to run these at the high speeds with a minimum number of "damages" (holes and other imperfections) per roll of cloth as demanded by modern competition. Combinations of different yarns on the same machine, which frequently increases the usefulness and looks of the cloth, add to the knitter's problems. Add to the above a complex fancy mechanism built into the machine for the knitter to operate and his usefulness as to the number of machines he can run is lowered, while greater skill is demanded of him.

Running fewer machines at a very much reduced speed has been common practice because of the difficulty involved in perfecting all the adjustments necessary on the fancy mechanism and also the knitting machine itself, not only to reduce the number of holes and other damages per run of cloth, but to prevent actual "smash-ups" as well.

Our device, as explained above, is readily removed from the knitting machine, and when this is done, the machine becomes a plain knitting machine. The result of this is that the knitter can adjust and service the machine in the same manner he would handle any other plain machine. This device or unit, being complete within itself, can be serviced off the machine by a separate expert. This servicing can include running tests at full speed by mounting it on the table of a drill press or vertical miller, by way of example, mounting a suitable gear on a shaft in the chunk spindle of the drill or milling machine and moving the gear of the unit in meshing contact with the gear on said spindle.

In operation tests it has been found possible to run the knitting machine at full speed while making fancies (pattern work), due in part to separability of the unit from the knitting machine and separately servicing the two and due in part to the constitution of the unit itself and the design of the jacks used in the unit.

The device explained above differs from present known fancy devices in various ways. We have already explained the difference between this device and fancy machines having built-in devices. The other much-used method of making fancies consists of using wheels at the various feeds geared into the needles so as to move certain of them to clear position, while leaving others in tuck or welt knitting position. These wheels have teeth or slots in their rims, and if they are to make patterns other than vertical stripes, the number of teeth in the wheel must divide evenly into the number of needles in the cylinder or dial after a remainder has been added or subtracted from said number. Thus, if the wheel operates in conjunction with a cylinder containing 396 needles, and the wheel has 96 teeth or slots in the rim, it will be seen that if a remainder of 12 is subtracted from 396, the wheel then divides into the resulting number 384 four times. This means that the number one slot or tooth contacts number one needle during revolution number one, contacts number 384 needle during revolution number two of the cylinder, and eight revolutions of the cylinder will be made before the slot in question again contacts number one needle. The resulting pattern can be 12 needles wide by 16 courses long. Furthermore, the pattern of necessity lies on a spiral around the fabric. This is due to the fact that eight different parts of a pattern must be on the 96 tooth wheel mentioned above. Thus, at number one needle the top of the pattern is made on needle number one by number one wheel. Number two wheel works the second course of pattern at number one needle in the above example, however, number three part of the pattern is made by number one wheel at number thirteen needle during revolution number one, number five part of the pattern at number twenty-five needle, etc. Number two wheel provides the even parts of the pattern. In the second revolution of the cylinder number one wheel at number one needle produces number three part of the pattern, etc., which provides the spiral mentioned above.

With our device, the patterns may be much wider than with wheels, and much longer, and yet are not made on a spiral. Elimination of the spiral aids in the makeup of the fabric as far as looks are concerned. Furthermore, the pattern drum of our device has sufficient moves or racks during the patterning so that it is frequently possible to make different designs at the two ends from those in the middle of the garment.

Having thus described one embodiment of our invention, and including a readily removable and replaceable self-contained needle selection attachment, unit, or device for selecting needles for pattern purposes, thereby to enable a circular, independent latch needle knitting machine, whether or not it be of the dial type (though shown as of the dial type), to be quickly transformed from a machine capable of making only simple designs or incapable of making designs into one capable of making very complex designs and also having disclosed sufficiently an independent latch needle knitting machine of the cylinder type and dial type having means whereby such attachment, unit or device may be readily attached in exact functioning position thereon and readily detached from such functioning position without disturbing the pattern-producing arrangement of its jack-like needle selecting members, we desire it to be understood that although specific terms are employed, they are used in a generic or descriptive sense, and not for purposes of limitation, the scope of the invention being set forth in the following claims.

We claim:

1. A circular knitting machine having at least one circle of independent needles lengthwise movable in the grooves of a circular supporting member therefor, and knitting cam means for imparting knitting movements to said needles, and a rotatable needle selection unit rotatable in accurately timed relation to the rotation of such circle of such needles or of their knitting cams, and having means for removably mounting the same upon the said knitting machine in such close proximity to such circle of independent needles that upon the functioning of said needle selection unit in the knitting operation, needles of such circle of needles are engaged and moved lengthwise in their grooves, thereby to control their knitting functions, whereby the knitting machine is caused to knit patterned tubular fabric or unpatterned tubular fabric, in accordance with the presence of said needle selection unit upon the said knitting machine or its removal therefrom, the said rotatable needle selection unit for the purpose of producing patterned fabric having jack-like elements respectively movable in grooves thereof in substantial parallelism with the axis of rotation of said needle selection unit, and in their said movements engageable with individual predetermined needles of such circle of needles and imparting movement to predetermined individual needles of such circle so as to govern their knitting functions by being rendered active or inactive, the said means for so removably mounting said needle selection unit upon the knitting machine, permitting it to be readily removed from its said functioning position upon the said knitting machine, but without thereby disturbing the relation of such jack-like elements to each other, and without interfering with the capacity of said jack-like elements to be moved manually or by the application of extraneous power, through their functioning operations, while said needle selection unit is off the knitting machine, and without thereby disturbing their pattern arrangement, and permitting said needle selection unit to be readily restored to its same functioning position upon the said knitting machine and there to continue its pattern-producing function.

2. A circular knitting machine having at least one circle of independent needles lengthwise movable in the grooves of a circular supporting member thereof in accordance with claim 1, wherein a plurality of said needle selection units are readily removably mounted upon the same knitting machine so as all to operate in producing the same fabric.

3. A circular independent latch needle, dial and cylinder knitting machine in accordance with claim 1, said needle selection unit having means to act upon individual dial needles of the said machine, to render them temporarily inactive and having means to render active again said temporarily inactive needles.

4. A circular knitting machine having at least one circle of independent needles lengthwise movable in the grooves of a circular supporting member thereof in accordance with claim 1, said needle selection unit having a self-contained retiming means.

5. A circular knitting machine having at least one circle of independent needles lengthwise movable in the grooves of a circular supporting member thereof in accordance with claim 1, said needle selection unit having a self-contained retiming means and means for remotely controlling said retiming means.

6. A circular knitting machine having at least one circle of independent needles lengthwise movable in the grooves of a circular supporting member thereof in accordance with claim 1, wherein said needle selection unit for rendering predetermined individual needles temporarily inactive includes individual, movable jack-like elements and means to cause said jack-like elements to follow a selecting or a non-selecting path.

7. A circular knitting machine having at least one circle of independent needles lengthwise movable in the grooves of a circular supporting member thereof in accordance with claim 1, wherein said needle selection unit for rendering predetermined individual needles temporarily inactive includes individual, movable jack-like elements and means to cause said jack-like elements to follow a selecting or a non-selecting path regardless of the pattern that is being knit.

8. A circular knitting machine having at least one circle of independent needles lengthwise movable in the grooves of a circular supporting member thereof in accordance with claim 1, wherein said needle selection unit for rendering predetermined individual needles temporarily inactive includes a rotatable member constituting a part of said selection unit, and having longitudinal slots upon its periphery and needle selecting jack-like elements slidably mounted in said slots for contact with selected needles.

9. A circular knitting machine having at least one circle of independent needles lengthwise movable in the grooves of a circular supporting member thereof in accordance with claim 1, wherein said needle selection unit for rendering predetermined individual needles temporarily inactive includes a rotatable member constituting a part of said selection unit, and having longitudinal slots upon its periphery and needle selecting jack-like elements slidably mounted in said slots for contact with selected needles, and wherein said needle selection unit includes also a rotatable pattern jack carrying member, the pattern jacks whereof act upon needle selecting jack-like elements carried in the slots of said rotatable member.

10. A circular knitting machine having at least one circle of independent needles lengthwise movable in the grooves of a circular supporting member thereof in accordance with claim 1, wherein said needle selection unit for rendering predetermined individual needles temporarily inactive includes a member rotatable in timed relation to the needle cylinder of the knitting machine, constituting a part of said selection unit, and having longitudinal slots upon its periphery and needle selecting jack-like elements slidably mounted in said slots for contact with selected needles, said needle selection unit further including sleeve means around said rotatable member and presenting cams to act upon said needle selecting jack-like elements to move them lengthwise in their said slots.

11. A circular knitting machine having at least one circle of independent needles lengthwise movable in the grooves of a circular supporting member thereof in accordance with claim 1, wherein said needle selection unit for rendering predetermined individual needles temporarily inactive includes a cylinder close to and rotatable in timed relation to the needle cylinder of the knitting machine, and having upon its periphery longitudinal slots and needle jack-like elements and companion needle selecting jack-like elements mounted in pairs in said slots and having interengageable formations whereby the needle jack-like elements are moved lengthwise in their slots and engage with knitting needles and render them temporarily inactive.

12. A circular knitting machine having at least one circle of independent needles lengthwise movable in the grooves of a circular supporting member thereof in accordance with claim 1, wherein said needle selection unit for rendering predetermined individual needles temporarily inactive includes a cylinder close to and rotatable in timed relation to the needle cylinder of the knitting machine, and having upon its periphery longitudinal slots and needle jack-like elements and companion needle selecting jack-like elements mounted in pairs in said slots and having interengageable formations whereby the needle jack-like elements are moved lengthwise in their slots and engage with knitting needles and render them temporarily inactive and a pattern jack drum also constituting a part of the selection unit, and co-operating means between said pattern jack drum and said needle jack and selecting jack cylinder, to act upon needle jack-like elements and selecting jack-like elements according to the dictates of the jack-like elements of said pattern jack drum.

13. A pattern controlling attachment unit that is readily attachable in operating position and is readily detachable from operating position on the framing of a circular, independent needle knitting machine, said attachment unit including a cylinder that when positioned upon such knitting machine is geared to a rotatable element thereof, said cylinder being peripherally longitudinally slotted, a set of needle jacks and a set of selecting jacks, one of each whereof are mounted in pairs in a face-to-face relation in respective slots of said cylinder.

14. A pattern controlling attachment unit that is readily attachable in operating position on and is readily detachable from operating position on the framing of a circular, independent needle knitting machine, said attachment unit including a cylinder that when positioned upon such knitting machine is geared to a rotatable element thereof, said cylinder being peripherally longitudinally slotted, a set of needle jacks and a set of selecting jacks and a set of selecting jacks, one of each whereof are mounted in pairs in a face-to-face relation in respective slots of said cylinder, racking means operating from said cylinder, constituting a part of said attachment unit and at least one pattern drum, also constituting a part of said attachment and operating connections between said pattern drum and selecting jacks of said cylinder, said attachment being self-contained, so that upon removal from the knitting machine, it can be caused to go through all moves for selection by rotating such cylinder by hand and moving the controls for the racking means, whereby, when the attachment unit is off the knitting machine, it will operate to select jacks according to prearranged pattern merely by turning the said slotted cylinder by hand.

15. Knitting apparatus comprising in combination: a circular, independent needle, cylinder and dial knitting machine, and a co-acting needle selection attachment unit, the latter having means to mount it removably upon the framing of said machine, said attachment unit having a series of movable jack-like elements individually co-acting with knitting needles so as to control the knitting movements thereof for complex design purposes, said attachment unit having a rotatable member whereon said jack-like elements are separately supported for needle controlling movements, said rotatable jack-like element supporting member being geared, when in operating position, with a rotating part of the knitting machine, so as to rotate in synchronism therewith, the said needle selection attachment unit, when removably mounted upon the knitting machine in functioning relation thereto, causing the incorporation of permissibly complex designs into the fabric being knitted, by causing said jack-like elements to control needle movements, the said attachment unit being readily manually movable from operating position into inoperative position with respect to knitting needles of said knitting machine, thereby quickly converting the said knitting machine into one capable of knitting fabric that is devoid of complex designs, at least, the said rotatable jack supporting member being constructed to receive and support for operating movements said jack-like elements thereon, in accordance with the requirements of either simple or complex designs.

16. A circular, independent latch needle, dial and cylinder knitting machine and needle selection attachment unit therefor, in accordance with claim 15, wherein the movable jack-like elements individually engage and render temporarily inactive, dial needles of said machine.

17. A circular, independent latch needle, dial and cylinder knitting machine and needle selection attachment unit therefor, in accordance with claim 15, wherein said jack-like elements have formations that when said elements are moved in their slots engage the hook ends of dial needles and move such needles inwardly in their slots into temporarily inactive position.

18. A circular, independent latch needle, dial and cylinder knitting machine and needle selection attachment unit therefor, in accordance with claim 15, wherein a plurality of said attachment units, each self-contained, are readily removably mounted upon the same knitting machine and individually co-operate with needles thereof.

19. A circular, independent latch needle, dial and cylinder knitting machine and needle selection attachment unit therefor, in accordance with claim 15, wherein the said attachment unit has self-controlled retiming means.

20. A circular, independent latch needle, dial and cylinder knitting machine and needle selection attachment unit therefor, in accordance with claim 15, wherein the rotatable member of said attachment unit has means to cause all of said jack-like elements to follow a selecting or a non-selecting path at will of the operator, regardless of the pattern of the design being produced upon the fabric by the co-operating action of such attachment unit.

21. A circular, independent latch needle, dial and cylinder knitting machine and needle selection attachment unit therefor, in accordance with claim 15, wherein the said attachment unit has self-controlled retiming means to reset the pattern design in a very small number of knitting courses.

22. A circular, independent latch needle, dial and cylinder knitting machine and needle selection attachment unit therefor, in accordance with claim 15, wherein the said rotatable jack-supporting member is movable in its functioning in accordance with a prearranged selection, without interfering with the normal operating movements of the said knitting machine.

23. For use in an independent needle knitting machine, a jack-like element constructed to receive a needle selecting move followed by a needle operating move, said jack-like element having a formation which, in action, engages directly with the head of a knitting needle in the knitting machine to move such needle in its groove into inactive position in combination with means to impart such needle selecting move and with means to impart such needle operating move, to said jack-like element, and means whereby, according to selection, such jack-like element will be locked in inoperative position or will be forced to follow a complete operative path.

24. A circular, independent latch needle, dial and cylinder knitting machine and needle selection attachment unit therefor, in accordance with claim 15, wherein the said attachment unit has step by step pattern drum advancing means, having a multiple of times of action per course of knitting a garment, in combination with blocking means to prevent certain advancing of such pattern drum advancing means, together with pattern erasing means for partial courses of knitting, thereby to eliminate repetition of pattern in certain areas of the fabric being knitted.

25. A circular knitting machine having at least one circle of independent needles lengthwise movable in the grooves of a circular supporting member thereof in accordance with claim 1, wherein the needle selection unit includes a cylinder geared, when in operating position, to a rotatable part of the knitting machine so as to rotate with the knitting needle cylinder, said selection unit cylinder being longitudinally slotted about its periphery, jack-like selecting elements mounted in and movable in said slots, and at least one pattern drum constituting a part of said selection unit, and means operated upon by pattern elements of said pattern drum to select for movement the jack-like elements in said selection unit cylinder.

26. A circular knitting machine having at least one circle of independent needles lengthwise movable in the grooves of a circular supporting member thereof in accordance with claim 1, wherein there is an operating connection from the main pattern member of the knitting machine whereon the selection unit is mounted, to cause said unit to begin its patterning action.

27. A circular knitting machine having at least one circle of independent needles lengthwise movable in the groves of a circular supporting member thereof in accordance with claim 1, wherein there is an operating connection from the main pattern member of the knitting machine whereon the selection unit is mounted, to cause said unit to terminate its patterning action.

28. A circular knitting machine having at least one circle of independent needles lengthwise movable in the grooves of a circular supporting member thereof in accordance with claim 1, wherein the needle selection unit includes a rotatable member constituting a part of said selection unit, and having longitudinal slots upon its periphery and needle selecting jack-like elements slidably mounted in said slots for contact with selected needles, and wherein there is, as a part of said selection unit, a lever 23 and operating connections from the main pattern member of the knitting machine whereon the selection unit is mounted, to operate said lever 23 and thereby to cause said needle selecting jack-like elements to follow an inactive path and thus to terminate the patterning action.

29. A circular knitting machine having at least one circle of independent needles lengthwise movable in the grooves of a circular supporting member thereof in accordance with claim 1, wherein the needle selection unit includes a rotatable member constituting a part of said selection unit, and having longitudinal slots upon its periphery and needle selecting jack-like elements slidably mounted in said slots for contact with selected needles, and wherein there is, as part of said selection unit a lever 23 and operating connections from the main pattern member of the knitting machine whereon the selection unit is mounted, to operate said lever 23 and thereby to produce one revolution of tuck stitches in the fabric being knitted, for a cutting line.

30. A circular knitting machine having at least one circle of independent needles lengthwise movable in the grooves of a circular supporting member thereof in accordance with claim 1, wherein the needle selection unit includes a rotatable member constituting a part of said selection unit, and having longitudinal slots upon its periphery and needle selecting jack-like elements slidably mounted in said slots for contact with selected needles, and wherein there are, as parts of said selection unit levers 20 and 23 and cams 52 and 53 and operating connections including a Bowden wire from the main pattern member of the knitting machine, whereby lever 23 is turned by such Bowden wire, thereby turning lever 20, and thereby moving said cams 52, 53 and through its positioning of said cams 52 and 53 to control the movements of said jack-like elements.

31. A circular knitting machine having at least one circle of independent needles lengthwise movable in the grooves of a circular supporting member thereof in accordance with claim 1, wherein the needle selection unit includes a rotatable member constituting a part of said selection unit, and having longitudinal slots upon its periphery and needle selecting jack-like elements slidably mounted in said slots for contact with selected needles, and wherein there are, as a part of said selection unit, cams 52, 53, that select the jack-like elements that are to pattern and wherein there are operating connections to said cams including a Bowden wire from the main pattern member of the knitting machine whereon the selection unit is mounted, whereby either cam 52, 53 may be placed in active position, or both of said cams may be placed in an inactive position.

32. A circular knitting machine having at least one circle of independent needles lengthwise movable in the grooves of a circular supporting member thereof in accordance with claim 1, wherein said selection unit includes a cylinder longitudinally slotted about its periphery and geared to a rotating part of the knitting machine so as to rotate, and having a needle jack-like element and a selecting jack-like element in each of said peripheral slots, and wherein there is a sleeve surrounding said slotted cylinder and having upon the inner surface thereof a set of cams for moving said needle and selecting jack-like elements downward to engage knitting needles and move them into non-knitting position and wherein there is a cam 52 which when moved into one position causes said jack-like elements to be acted upon by said cams thereby to move said jack-like elements downward, and wherein there is an operative connection from the main pattern member of the knitting machine to said cam 52 to move said cam into said one position.

33. A circular knitting machine having at least one circle of independent needles lengthwise movable in the grooves of a circular supporting member thereof in accordance with claim 1, wherein said selection unit includes a cylinder longitudinally slotted about its periphery and geared to a rotating part of the knitting machine so as to rotate, and having a needle jack-like element and a selecting jack-like element in each of said peripheral slots, and wherein, constituting a part of said selection unit there are two pattern drums, 81 and 83, and operating pawls 191 and 191' for retiming said pattern drums 81, 83, at the completion of each knitted garment, so that each garment will start at the same place in the pattern.

34. A circular knitting machine having at least one circle of independent needles lengthwise movable in the grooves of a circular supporting member thereof in accordance with claim 1, wherein said selection unit includes a cylinder longitudinally slotted about its periphery and geared to a rotating part of the knitting machine so as to rotate, and having a needle jack-like element and a selecting jack-like element in each of said peripheral slots, and wherein, constituting a part of said selection unit there are two pattern drums, 81 and 83, and operating pawls 191 and 191' for retiming said pattern drums 81, 83, at the completion of each knitted garment, so that each garment will start at the same place in the pattern, and wherein there is a Bowden wire connection from a main pattern member of the knitting machine to move said pattern drum 81 and thereby to start the patterning.

35. A circular knitting machine having at least one circle of independent needles lengthwise movable in the grooves of a circular supporting member thereof in accordance with claim 1, wherein said selection unit includes a cylinder longitudinally slotted about its periphery and geared to a rotating part of the knitting machine so as to rotate, and having a needle jack-like element and a selecting jack-like element in each of said peripheral slots, and wherein, constituting a part of said selection unit there are two pattern drums, 81 and 83, in vertical alignment, and wherein a series of cam levers are mounted in vertical alignment to be acted upon by pattern jacks carried by said pattern drum 81 and consequently to act upon and to move crosswise said needle jack-like elements and selecting jack-like elements, and wherein a lever is operatively interrelated to said pattern drum 83 to cause said needle and selecting jack-like element to follow an active path.

36. A circular knitting machine having at least one circle of independent needles lengthwise movable in the grooves of a circular supporting member thereof in accordance with claim 1, wherein said selection unit includes a cylinder longitudinally slotted about its periphery and geared to a rotating part of the knitting machine so as to rotate, and having a needle jack-like element and a selecting jack-like element in each of said peripheral slots, and wherein there is a sleeve surrounding said slotted cylinder and having upon the inner surface thereof a set of cams for moving said needle and selecting jack-like elements downward to engage knitting needles and move them into non-knitting position and wherein upon the inner surface of said sleeve below the first mentioned set of cams, there is a second set of cams to return said jack-like elements to their upper position.

37. A circular knitting machine having at least one circle of independent needles lengthwise movable in the grooves of a circular supporting member thereof in accordance with claim 1, wherein said selection unit includes a cylinder longitudinally slotted about its periphery and geared to a rotating part of the knitting machine so as to rotate, and having a needle jack-like element and a selecting jack-like element in each of said peripheral slots, and wherein, constituting a part of said selection unit there are two pattern drums, 81 and 83, in vertical alignment, and wherein a series of cam levers are mounted in vertical alignment to be acted upon by pattern jack-like elements carried by said pattern drum 81 and consequently to act upon and to move downward said needle jack-like elements and selecting jack-like elements, and wherein there are positioned in operative relation to pattern jack-like elements carried by said pattern drum 83, a lever 170 to cause needle jack-like elements and pattern jack-like elements to follow an active path and also levers 174 and 176 to cause the needle jack-like elements and selecting jack-like elements to follow an idle path and therefore not to be moved downward in their slots in the said slotted cylinder.

38. A circular knitting machine having at least one circle of independent needles lengthwise movable in the grooves of a circular supporting member thereof in accordance with claim 1, wherein said selection unit includes a cylinder longitudinally slotted about its periphery and geared to a rotating part of the knitting machine so as to rotate, and having a needle jack-like element and a selecting jack-like element in each of said peripheral slots, and wherein, constituting a part of said selection unit there are two pattern drums, 81 and 83, having ratchets 84, 85, and wherein there are a pawl 190 and pawls 191, 191', to act on said pattern drums.

39. A circular knitting machine having at least one circle of independent needles lengthwise movable in the grooves of a circular supporting member thereof in accordance with claim 1, wherein there is an adapter secured to a horizontal portion of the framing of the knitting machine adjacent to the needle cylinder thereof to receive and to have secured thereto the said selection unit.

40. Knitted pattern controlling means comprising in combination a circular, independent needle, dial and cylinder knitting machine and patterning means mounted thereon adjacent the needle cylinder, said patterning means comprising a cylinder that is geared to a rotatable element of said knitting machine and being peripherally longitudinally slotted, a set of needle jacks and a set of selecting jacks, one of each whereof are mounted in pairs in a face-to-face relation in respective slots in said cylinder, means to determine which of said sets of needle jacks and selecting jacks shall operate in producing the pattern, and means to operate such determined-upon jacks to cause such determined-upon needle jacks to engage needles and move them into inactive position.

41. Knitted pattern controlling means in accordance with claim 40, wherein such needle jacks, when active in accordance with the pattern, act upon dial needles of the knitting machine to render them temporarily inactive, thereby producing a pattern in the fabric.

42. Knitted pattern controlling means in accordance with claim 40, wherein said patterning means includes at least one pattern drum having pattern jacks and wherein said pattern controlling means is provided with retiming means for such pattern drum.

43. Knitted pattern controlling means in accordance with claim 40, wherein such needle jacks, when active in accordance with the pattern, act upon dial needles of the knitting machine to render them temporarily inactive, thereby producing a pattern in the fabric, and wherein said pattern controlling means is provided with means to produce one revolution of tuck stitches in the fabric being knitted, for a cutting line.

44. For use in knitted pattern controlling means for independent latch needle knitting machines, a needle jack and a companion selecting jack adapted to be positioned in the same slot of a supporting member in face-to-face relation, said needle jack having a folded over upper end and the selecting jack having an upper end that in action engages said folded over end of the needle jack to move the latter.

45. For use in knitted pattern controlling means for independent latch needle knitting machines, a needle jack and a companion selecting jack adapted to be positioned in the same slot of a supporting member in face-to-face relation, said needle jack having a folded over upper end and the selecting jack having an upper end that in action engages said folded over end of the needle jack to move the latter, said needle jack and said selecting jack each having at its inner edge a fulcrum about which it may be rocked, whereby when the selecting jack is moved inward at its upper end, upon its fulcrum, the companion needle jack is rocked inwardly upon its fulcrum by the selecting jack.

46. For use in knitted pattern controlling means for independent latch needle knitting machines, a needle jack and a companion selecting jack adapted to be positioned in the same slot of a supporting member in face-to-face relation, said needle jack having a folded over upper end and the selecting jack having an upper end that in action engages said folded over end of the needle jack to move the latter, the needle jack having at its rear edge at its upper end a rearwardly extending heel adapted to be engaged by a disk edge on the pattern controlling means, and having at its front edge at its upper end a butt to be engaged in a cam part when such needle jack is moved inwardly.

47. For use in knitted pattern controlling means for independent latch needle knitting machines, a needle jack for operation directly upon the hook end of a latch needle of the knitting machine, said needle jack having at an end thereof a member bent laterally from the plane of the shank of the needle jack, and in operation acting to engage the outer end of the hook of the knitting needle, and in the continued movement of said needle jack, to push such needle inwardly in its groove into inactive position.

48. For use in knitted pattern controlling means for independent latch needle knitting machines, a needle jack having at one end a forward extension in the plane of the shank of the said needle jack, said forward extension being bent upon itself at a right angle to provide a formation at right angles to the plane of the shank of the jack, to engage the outer end of the hook of a knitting needle and to push such needle inwardly in its groove into inactive position.

49. For use in knitted pattern controlling means for independent latch needle knitting machines, a needle jack and a companion selecting jack adapted to be positioned in the same slot of a supporting member in face-to-face relation, said needle jack having a folded over upper end and the selecting jack having an upper end that in action engages said folded over end of the needle jack to move the latter, the needle jack having at its rear edge at its upper end a rearwardly extending heel adapted to be engaged by a disk edge on the pattern controlling means, and having at its front edge at its upper end a butt to be engaged in a cam part when such needle jack is moved inwardly, said needle jack and said selecting jack each having near its lower end upon its front edge a forwardly extending butt.

50. For use in knitted pattern controlling means for independent latch needle knitting machines, a needle jack having at one end a forward extension in the plane of the shank of the said needle jack, said forward extension being bent upon itself at a right angle to provide a formation at right angles to the plane of the shank of the jack, to engage the outer end of the hook of a knitting needle and to push such needle inwardly in its groove into inactive position, said right angled formation being slightly grooved in a direction lengthwise of the shank of said needle jack, to engage the outer end of the hook of the knitting needle.

51. A circular knitting machine with the said readily removable needle selection unit, in accordance with claim 1, wherein the knitting machine is provided with two interknitting circles of independent needles and their operating cams, namely, a circle of cylinder needles and a circle of co-acting dial needles, whereby ribbed fabric is produced, and which is patterned by the co-operation of said jack-like elements of said readily removable needle selection unit with the needles of one of said circle of needles.

52. A circular knitting machine with the said readily removable needle selection unit, in accordance with claim 1, wherein the knitting machine is provided with two interknitting circles of independent needles and their operating cams, namely, a circle of cylinder needles and a circle of co-acting dial needles, whereby ribbed fabric is produced, and which is patterned by the co-operation of said jack-like elements of said readily removable needle selection unit with the needles of said circle of dial needles.

53. A needle selection unit for a circular independent needle knitting machine, having a base adapted to be received upon the framing of a circular knitting machine and readily removable from and readily replaceable upon the knitting machine in functioning position, so that when in operation upon the knitting machine, patterned fabric is produced, the said needle selection unit having a rotatable cylinder provided about its periphery with longitudinal grooves in parallelism with the axis of rotation of said cylinder, and jack-like elements respectively movable in such grooves and in their said movements adapted to act upon predetermined needles of a knitting machine so as to control the knitting functions of predetermined knitting needles, the cylinder of said needle selection unit when off a knitting machine being rotatable manually or by the application of extraneous power, for testing or for change of pattern or the like, thereby to cause said jack-like elements to go through patterning movements, but without disturbing their relation to each other, except to change pattern, whereby said needle selection unit can be positioned by placing its base upon the framing of a circular knitting machine and removably fastening it thereto so that its cylinder can be rotated by the knitting machine power.

54. A circular knitting machine having at least one circle of independent lengthwise movable needles, at least one circular needle support having needle receiving grooves wherein such needles are lengthwise movable; knitting cams for such needles; at least one yarn feeding means supported upon the knitting machine in operative relation to the said knitting needles, and a rotatable needle selection unit, said unit and said knitting machine having co-acting, interengageable supporting formations, whereby said unit may be readily mounted in operating position upon said knitting machine in close proximity to the needles and may be readily removed as a unit from its said operating position, and whereby when the said unit is so mounted upon said knitting machine, said machine produces so-called fancy work, and when the unit is removed from the knitting machine, said machine produces non-fancy work, the said rotatable needle selection unit being at least in part of general cylindrical form and including a cylinder with peripheral lengthwise extending jack-receiving grooves, the said unit having means whereby, when in position upon the knitting machine it is rotated in accurately timed relation to the rotation of such circle of needles or their knitting cams, the said needle selection unit having jack-like needle engaging elements respectively lengthwise movable in the grooves thereof in substantial parallelism with the axis of rotation of said unit, and in their said movements engageable with predetermined knitting needles and imparting movement thereto so as to govern their knitting functions by being thereby rendered active or inactive, the said needle selection unit being readily removable and replaceable as stated, without thereby disturbing the relation of such jack-like needle engaging elements to each other and without interfering with the capacity of said jack-like needle engaging elements to be moved manually or by extraneous power through their functioning operations while said needle selection unit is off the knitting machine, and without disturbing their pattern arrangement.

55. A circular knitting machine and rotatable needle selection unit in accordance with claim 54, wherein said needle selection unit has as a part thereof a series of pattern jacks positioned in co-operating relation with said jack-like needle engaging elements and determining the patterning movements of the latter.

56. A circular knitting machine and rotatable needle selection unit in accordance with claim 54, wherein said needle selection unit has as a part thereof pattern jack supporting means comprising at least one pattern jack drum having peripheral lengthwise extending grooves wherein pattern jacks are mounted.

57. A circular knitting machine and rotatable needle selection unit in accordance with claim 54, wherein said needle selection unit has as a part thereof pattern jack supporting means comprising at least one pattern jack drum having peripheral lengthwise extending grooves wherein pattern jacks are mounted, the said needle selection unit having means to rotate said pattern jack supporting means, and also having a series of movable members interposed between said pattern jacks and the said jack-like needle engaging elements and co-operating therewith to move said jack-like needle engaging elements in accordance with the indications of said pattern jacks.

58. A circular knitting machine and rotatable needle selection unit in accordance with claim 54, wherein said needle selection unit has as a part thereof pattern jack supporting means comprising at least one pattern jack drum having peripheral lengthwise extending grooves wherein pattern jacks are mounted, the said needle selection unit having means to rotate said pattern jack supporting means, and also having a series of movable members interposed between said pattern jacks and the said jack-like needle engaging elements and co-operating therewith to move said jack-like needle engaging elements in accordance with the indications of said pattern jacks, the said needle selection unit having also cam means to impart lengthwise movement to those jack-like needle engaging elements that are selected by the said pattern jacks and thereby to engage predetermined knitting needles and move them into non-knitting position.

59. A circular knitting machine having at least one circle of independent needles lengthwise movable in the grooves of a circular supporting member thereof, in accordance with claim 1, wherein said selection unit includes a cylinder longitudinally slotted about its periphery and geared to a rotating part of the knitting machine thereby to rotate, and having a needle jack-like element and a selecting jack-like element in each of said peripheral slots, and wherein, constituting a part of said selection unit there are two pattern drums, 81 and 83, and operating pawls 191 and 191′ for retiming said pattern drums 81, 83, at the completion of each knitted garment, so that each garment will start at the same place in the pattern, and wherein there is an operating pawl 190 for starting said pattern drums 81 and 83, and for operating them through their pattern moves, and wherein there are levers 195 and 195′ respectively controlling said pawls 190, 191 and 191′, and wherein there is a Bowden wire connection from a main pattern member of the knitting machine for controlling said levers 195 and 195′.

60. In combination in a circular, independent needle knitting machine having a circular needle supporting member, an independent latch needle mounted in a lengthwise groove of said circular needle supporting member, and a needle jack for operating directly upon the hook end of said needle to push said needle inward in its groove into inactive position, said needle jack having at an end thereof a member bent laterally from the plane of the shank of such needle jack, and in operation acting to engage the outer end of the hook of such knitting needle, and acting in the continued movement of said needle jack to push such needle into inactive position.

61. In a circular knitting machine having a needle jack circular supporting member and having at least one circle of independent latch needles movable lengthwise in the grooves of said circular supporting member therefor, a series of needle jacks for operating directly and respectively upon the hooks of such needles to push said needles inward in their respective grooves into inactive position, said needle jacks each having at an end thereof a member bent laterally from the plane of the shank of such needle jack, and in operation acting to engage the outer end of the hook of a knitting needle that it engages, and acting in its continued movement to push such needle into inactive position.

62. In a circular, independent latch needle dial and cylinder knitting machine, a series of independent latch needles movable lengthwise in the grooves of the said dial, a series of needle jacks for operating directly and respectively upon the hooks of such dial needles to push such dial needles inward in their grooves into inactive position, said needle jacks each having at an end thereof a member bent laterally from the plane of the shank of such needle jack, and in operation acting to engage the outer end of the hook of such knitting needle, and a longitudinally grooved, rotary supporting member for such needle jacks in the respective grooves of such rotary supporting member.

63. In a circular, independent latch needle dial and cylinder knitting machine, a series of independent latch needles movable lengthwise in the grooves of the said dial, a series of needle jacks for operating directly and respectively upon the hooks of such dial needles to push such dial needles inward in their grooves into inactive position, said needle jacks each having at an end thereof a member bent laterally from the plane of the shank of such needle jack, and in operation acting to engage the outer end of the hook of such knitting needle, and a longitudinally grooved, rotary supporting member for such needle jacks in the respective grooves of such rotary supporting member, and pattern means for determining and controlling the lengthwise movements of said needle jacks in said rotary support.

64. For use in an independent needle knitting machine, a jack-like element constructed to receive a needle selecting move followed by a needle operating move, said jack-like element having a formation which, in action, engages directly with the head of a knitting needle in the knitting machine to move such needle in its groove into inactive position, and a companion selecting jack said jack-like element also having, at its upper end, a folded over portion for engagement by said companion selecting jack, in combination with co-operating means to impart such needle selecting move and with means to impart such needle operating move, to said jack-like element, and means whereby, according to selection, such jack-like element will be locked in inoperative position or will be forced to follow a complete operative path.

65. In a circular, independent needle knitting machine having a cylinder provided with substantially parallel, longitudinally extending needle slots on the outer surface thereof and a cam ring with respect to which said slotted needle cylinder is relatively rotatable; independent needles in said slots respectively, and to which lengthwise knitting movements are imparted, a rotatable member and a surrounding cam sleeve located above and in operative relation to said needle cylinder and its cam ring, said rotatable member having on the outer surface thereof longitudinally extending slots each with dual needle jack units therein; said rotatable member having a cam formation for imparting radial movement to the jacks, and each said needle jack unit having an extending cam formation, the said needle jack units each having a needle operating movement in a direction that is lengthwise of such jack unit and having capacity for a needle selecting movement that is at right angles to its needle operating movement, said cam sleeve having a cam under which the butts of said needle jack units may come and be thereby held in determined radial position.

66. In a circular, independent needle knitting machine having a cylinder provided with substantially parallel, longitudinally extending needle slots on the outer surface thereof and a cam ring with respect to which said slotted needle cylinder is relatively rotatable; independent needles in said slots respectively, and to which lengthwise knitting movements are imparted; a rotatable member and a surrounding cam sleeve located above and in operative relation to said needle cylinder and its cam ring, said rotatable member having on the outer surface thereof longitudinally extending slots each with two separate needle jacks therein, one of each of said needle jacks having a bent-over upper end 14 and the other of said jacks having an upper terminal formation co-operating with said bent-over upper end 14; said rotatable member having a cam formation for imparting radial movements to the jacks, and at least one of said needle jacks having an extending cam formation, the said needle jacks each having a needle operating movement in a direction that is lengthwise of such jack and having capacity for a needle selecting movement that is at right angles to its needle operating movement, and said cam sleeve having a cam under which the butts of said needle jacks may come and be thereby held in determined radial position.

References Cited in the file of this patent

UNITED STATES PATENTS

| | | |
|---|---|---|
| 573,743 | Williams | Dec. 22, 1896 |
| 1,613,304 | Ballard | Jan. 4, 1927 |
| 1,846,793 | Christensen | Feb. 23, 1932 |
| 1,974,473 | Sheppard | Sept. 25, 1934 |
| 2,153,019 | Holmes | Apr. 4, 1939 |

FOREIGN PATENTS

| | | |
|---|---|---|
| 461,016 | Great Britain | Feb. 9, 1937 |
| 591,269 | Great Britain | Aug. 13, 1947 |